(12) United States Patent
Kume

(10) Patent No.: US 11,332,133 B2
(45) Date of Patent: May 17, 2022

(54) DRIVER ASSIST APPARATUS AND DRIVER ASSIST PROGRAM

(71) Applicant: DENSO CORPORATION, Kariya (JP)

(72) Inventor: Takuya Kume, Kariya (JP)

(73) Assignee: DENSO CORPORATION, Kariya (JP)

( * ) Notice: Subject to any disclaimer, the term of this patent is extended or adjusted under 35 U.S.C. 154(b) by 259 days.

(21) Appl. No.: 16/653,281

(22) Filed: Oct. 15, 2019

(65) Prior Publication Data

US 2020/0039510 A1 Feb. 6, 2020

Related U.S. Application Data

(63) Continuation of application No. PCT/JP2018/015657, filed on Apr. 16, 2018.

(30) Foreign Application Priority Data

Apr. 26, 2017 (JP) .............................. JP2017-087363

(51) Int. Cl.
*B60W 30/095* (2012.01)
*B60W 50/14* (2020.01)
*G08G 1/16* (2006.01)

(52) U.S. Cl.
CPC ........ *B60W 30/0956* (2013.01); *B60W 50/14* (2013.01); *G08G 1/16* (2013.01); *B60W 2050/143* (2013.01); *B60W 2400/00* (2013.01); *B60W 2520/105* (2013.01); *B60W 2554/4041* (2020.02); *B60W 2554/804* (2020.02)

(58) Field of Classification Search
CPC ....... B60R 21/00; B60W 10/18; B60W 10/20; B60W 2050/143; B60W 2050/146; B60W 2400/00; B60W 2520/105; B60W 2554/4041; B60W 2554/4042; B60W 2554/801; B60W 2554/802; B60W 2554/804; B60W 30/09; B60W 30/0956;
(Continued)

(56) References Cited

U.S. PATENT DOCUMENTS 6,114,951 A 9/2000 Kinoshita et al.
8,880,319 B2 * 11/2014 Tsuruta .................. G08G 1/166
701/96
(Continued)

FOREIGN PATENT DOCUMENTS

JP H10181487 A 7/1998
JP 2803514 B2 9/1998
(Continued)

*Primary Examiner* — Babar Sarwar
(74) *Attorney, Agent, or Firm* — Harness, Dickey & Pierce, P.L.C.

(57) ABSTRACT

A driver assist apparatus includes: an information acquisition section that obtains a detected information of a different vehicle driving; a calculation section that calculates a risk estimation value representing a level of risk imposed on the subject vehicle by the different vehicle; a selection section that selects driver assist content corresponding to the risk estimation value; and a merging determination section that determines whether the different vehicle cuts into the expected course. Driver assist corresponding to the different vehicle cutting into the expected course is performed earlier than driver assist corresponding to a preceding vehicle driving on a lane on which the subject vehicle drives.

23 Claims, 29 Drawing Sheets

(58) Field of Classification Search
CPC ......... B60W 50/14; G08G 1/16; G08G 1/163; G08G 1/166; G08G 1/167
See application file for complete search history.

(56) References Cited

U.S. PATENT DOCUMENTS

| | | | | |
|---|---|---|---|---|
| 2004/0061596 A1* | 4/2004 | Egami | .................... | G08G 1/165 340/425.5 |
| 2006/0111842 A1* | 5/2006 | Sugimoto | .............. | G08G 1/167 701/301 |
| 2007/0225882 A1* | 9/2007 | Yamaguchi | .......... | B60W 30/095 701/36 |
| 2008/0004807 A1 | 1/2008 | Kimura et al. | | |
| 2008/0208408 A1* | 8/2008 | Arbitmann | ............ | B60W 10/06 701/41 |
| 2012/0078498 A1* | 3/2012 | Iwasaki | ................. | B60W 10/06 701/300 |
| 2012/0235853 A1* | 9/2012 | Takeuchi | .......... | B60W 30/0953 342/71 |
| 2013/0166150 A1* | 6/2013 | Han | ...................... | B60W 10/06 701/42 |
| 2014/0176714 A1* | 6/2014 | Li | .......................... | G08G 1/166 348/148 |
| 2015/0262487 A1* | 9/2015 | Cazanas | ................ | B60W 30/09 701/301 |
| 2016/0009284 A1* | 1/2016 | Tokimasa | .............. | G01S 13/931 701/96 |
| 2018/0211536 A1* | 7/2018 | Akamine | .............. | G01S 13/723 |
| 2019/0012919 A1* | 1/2019 | Brandriff | ................ | G08G 1/167 |
| 2021/0179094 A1* | 6/2021 | Newman | .................. | G08G 1/16 |

FOREIGN PATENT DOCUMENTS

| | | | |
|---|---|---|---|
| JP | 2000137900 A | 5/2000 | |
| JP | 2007253723 A | 10/2007 | |
| JP | 20086922 A | 1/2008 | |
| JP | 201791168 A | 5/2017 | |
| WO | WO-2010/140215 A | 12/2010 | |

* cited by examiner

FIG. 7

| ALARM LEVEL | LOW | MEDIUM | HIGH |
|---|---|---|---|
| AIM | INFORM UNOBTRUSIVELY | INFORM UNOBTRUSIVELY BUT CLEARLY ENOUGH TO NOTICE IF DISTRACTED OR DROWSY | INFORM CLEARLY |
| HUD | SUPPLEMENTAL INFORMATION (DIRECT ATTENTION AHEAD) | ↓ | ↓ |
| NAVIGATION/CENTER/ METER DISPLAY | SUPPLEMENTAL INFORMATION (DIRECT ATTENTION AHEAD) | ↓ | ↓ |
| (ULTRASONIC) SPEAKER | | LOW SOUND (NOT NECESSARY IF THERE IS HAPTIC DEVICE) | HIGH SOUND |
| PERIPHERAL VISION DEVICE | DIM ILLUMINATION | BLINK SLOWLY | BLINK RAPIDLY |
| HAPTIC DEVICE | | STEERING/PEDAL VIBRATION | STEERING/PEDAL VIBRATION |

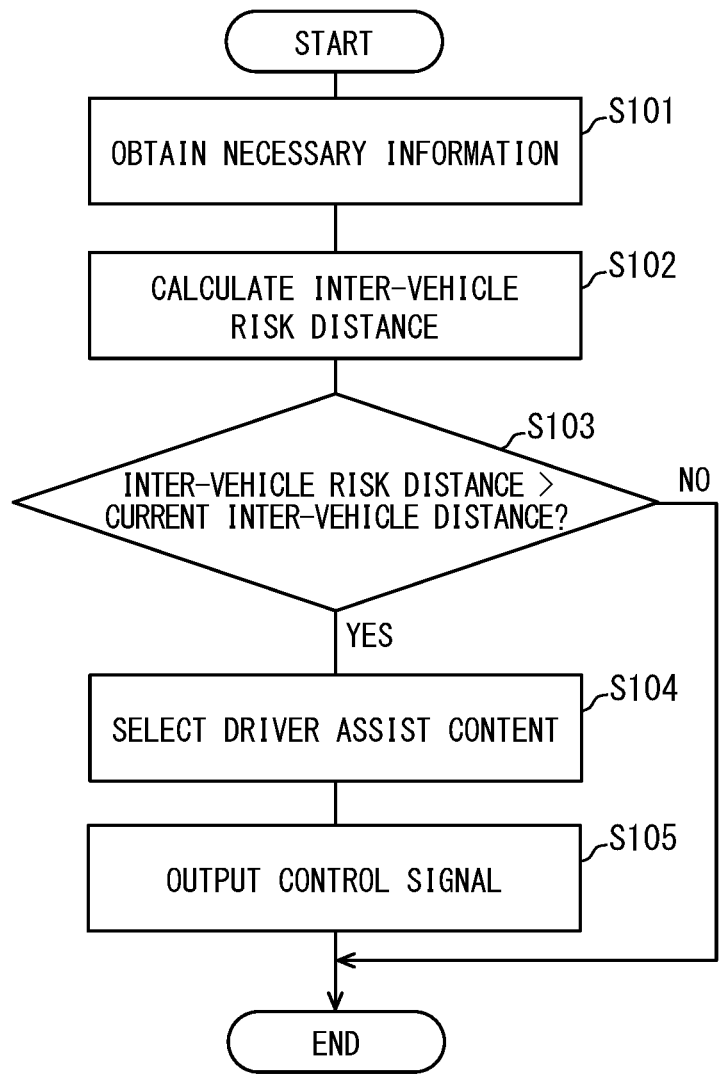

FIG. 12
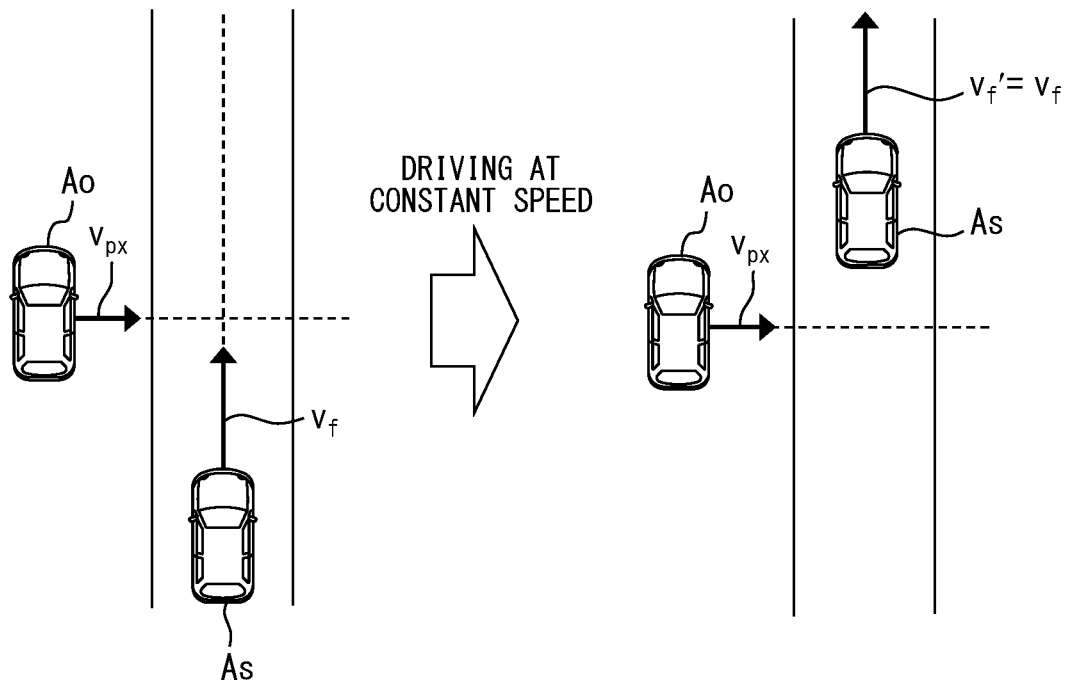
DRIVING AT CONSTANT SPEED
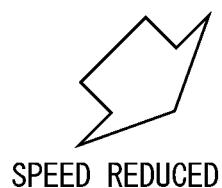
SPEED REDUCED
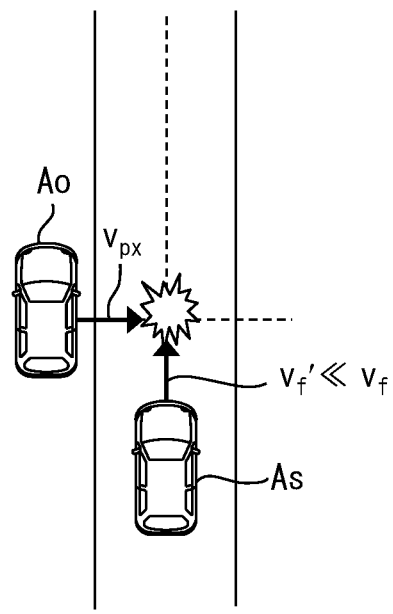

DRIVER ASSIST APPARATUS AND DRIVER ASSIST PROGRAM

CROSS REFERENCE TO RELATED APPLICATION

The present application is a continuation application of International Patent Application No. PCT/JP2018/015657 filed on Apr. 16, 2018, which designated the U.S. and claims the benefit of priority from Japanese Patent Application No. 2017-087363 filed on Apr. 26, 2017. The entire disclosures of all of the above applications are incorporated herein by reference.

TECHNICAL FIELD

The present disclosure relates to driver assist techniques for assisting the driver on a vehicle with driving tasks.

BACKGROUND

A related art may describe an inter-vehicle distance alarm device as a driver assist apparatus, which calculates the inter-vehicle distance between a subject vehicle and a vehicle ahead, and generates an alarm for the driver when the calculated inter-vehicle distance falls below an alarm-triggering inter-vehicle distance.

SUMMARY

The present disclosure describes a driver assist apparatus that is configured to: obtain detected information of a different vehicle; calculate a risk estimation value representing a level of risk imposed on the subject vehicle; select driver assist content corresponding to the risk estimation value; and determine whether the different vehicle cuts into the expected course.

BRIEF DESCRIPTION OF DRAWINGS

Objects, features, and advantages of the present disclosure will become more apparent from the following detailed description with reference to the accompanying drawings. In the drawings:

FIG. 7 is a diagram showing examples of correspondence between alarm levels and operations of various information presentation devices;

FIG. 10 is a flowchart showing the details of a driver assist process based on an inter-vehicle risk distance;

FIG. 12 is a diagram giving a detailed explanation of a scene where alarm presentation should be refrained;

FIG. 33 is a diagram showing one example of a scene where it is determined that there is a possibility of the subject vehicle cutting in;

DETAILED DESCRIPTION

Figure 1:
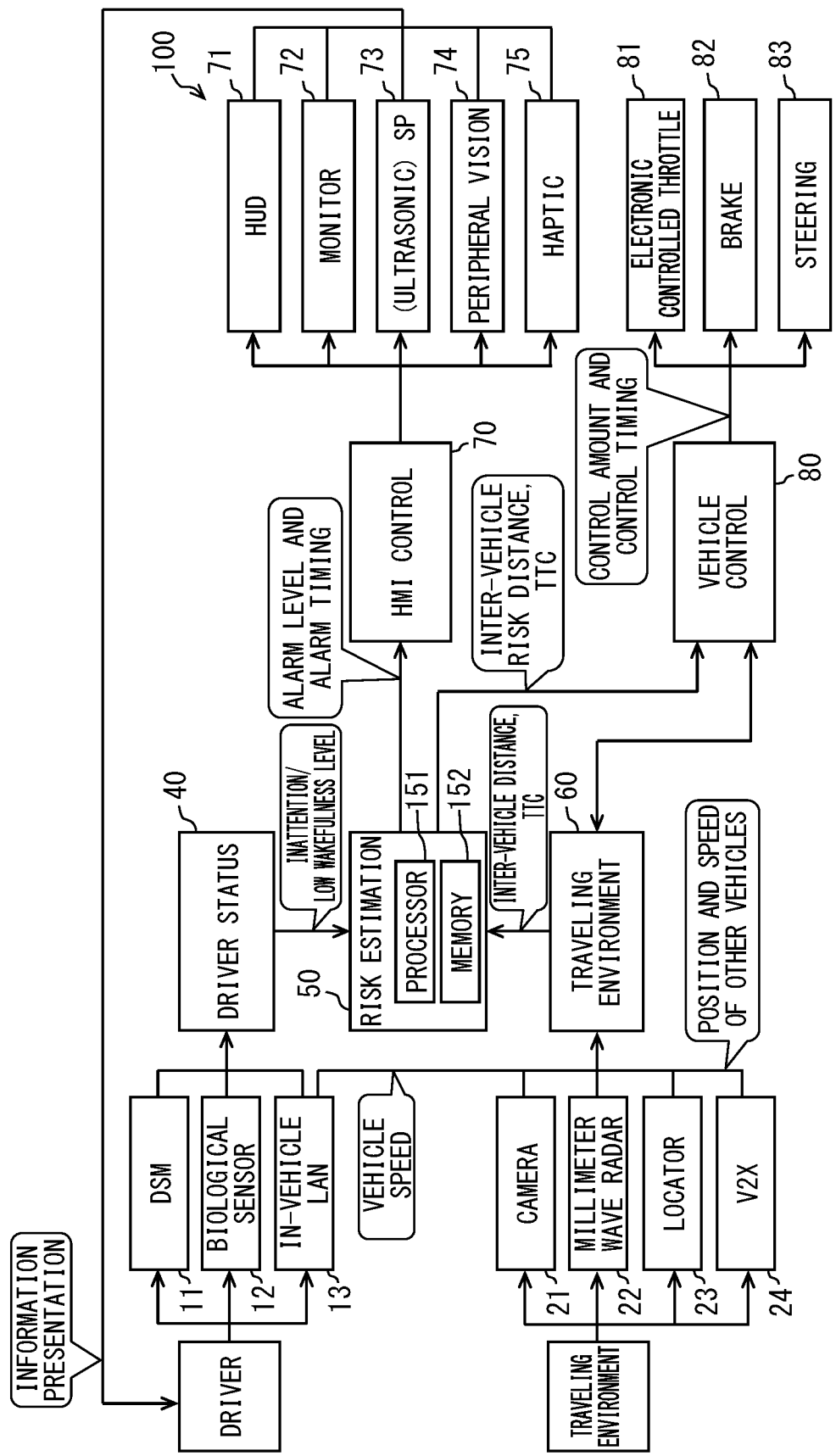
FIG. 1 is a block diagram showing the entire view of an in-vehicle system mounted to a vehicle.

It is conceivable that a different vehicle recognized by an inter-vehicle distance alarm device as intended targets for alarm generation are limited to a different vehicle traveling on an expected course of a subject vehicle. Therefore, if, for example, the different vehicle running in an adjacent lane cuts into the expected course of the subject vehicle, the inter-vehicle distance alarm device becomes ready for alarm generation when the different vehicle has completely moved into the lane in which the subject vehicle is traveling. With such a process, the alarm regarding the different vehicle cutting in front of the subject vehicle may be sudden.

It is conceivable to include the different vehicle traveling in adjacent lanes in the intended targets for alarm generation so as to enable smooth alerting of the different vehicle cutting in front of the subject vehicle. Identifying the different vehicle running off the expected course of the subject vehicle as alarm targets similar to the different vehicle driving on the expected course of the subject vehicle may result in frequent unnecessary alarms regarding the different vehicle. That is, smooth driver assistance may hardly be provided by simply including the different vehicle traveling in adjacent lanes in the intended targets for alarm generation.

The present disclosure describes a driver assist apparatus and a driver assist program that enable smooth execution of driver assistance for assisting the driver with driving tasks in accordance with risks imposed by the different vehicle.

According to one aspect of the present disclosure, a driver assist apparatus may be configured to: obtain detected information of a different vehicle; calculate a risk estimation value representing a level of risk imposed on the subject vehicle; select driver assist content corresponding to the risk estimation value; and determine whether the different vehicle cuts into the expected course.

According to another aspect of the present disclosure, a computer-readable non-transitory tangible storage medium storing a driver assist program may be provided. The driver assist program assisting a driver on a subject vehicle with driving tasks may cause a processor to execute: acquiring detected information of a different vehicle; calculating a risk estimation value representing a level of risk imposed on the subject vehicle by the different vehicle; determining whether the different vehicle cuts into the expected course; and selecting driver assist content corresponding to the calculated risk estimation value.

According to these aspects, the risk estimation value is calculated based on the detected information related to a lateral position of the different vehicle, on an assumption that the different vehicle, even though it is not on the expected course of the subject vehicle, will move into the expected course of the subject vehicle. Therefore, even when the different vehicle is driving off the expected course of the subject vehicle, a driver assist content corresponding to the risk estimation value of the different vehicle can be selected. Accordingly, even if the different vehicle cuts into the expected course of the subject vehicle, it may be possible that a driver assistance to assist the driver with the driving is performed smoothly in accordance with the risk imposed by the different vehicle.

According to another aspect of the present disclosure, a driver assist apparatus may be configured to: obtain detected information of a different vehicle driving around a subject vehicle; calculate a risk estimation value representing a level of risk imposed on the subject vehicle by the different vehicle; select driver assist content corresponding to the risk estimation value calculated by the calculation section; and determine whether the subject vehicle cuts into the expected course of the different vehicle, and the different vehicle cuts into an expected course of the subject vehicle.

According to this configuration, even in a scene where the subject vehicle will move into an expected course of the different vehicle, the risk estimation value is calculated based on the detected information related to a lateral position of the different vehicle, on an assumption that the subject vehicle will move into the expected course of the different vehicle. Therefore, even when the subject vehicle is driving off the expected course of the different vehicle, driver assist content corresponding to the risk estimation value can be selected. Accordingly, even if the subject vehicle cuts into the expected course of the different vehicle, it may be possible that driver assistance assisting the driver with the driving is performed smoothly in accordance with the risk imposed by the different vehicle.

Several embodiments of the present disclosure will be described with reference to the drawings. Corresponding constituent elements in various embodiments may be given the same reference numerals to avoid repetitive descriptions. Where only some features of a configuration are described in each embodiment, the configuration of previously described other embodiments may be applicable to other features of the configuration. In addition to the combinations of configurations specifically shown in various embodiments, the configurations of various embodiments can be partly combined even if not explicitly suggested, unless such combinations are contradictory. It should be understood that such unspecified combinations of configurations described in various embodiments and variation examples are also disclosed by the following description.

First Embodiment

Figure 2:
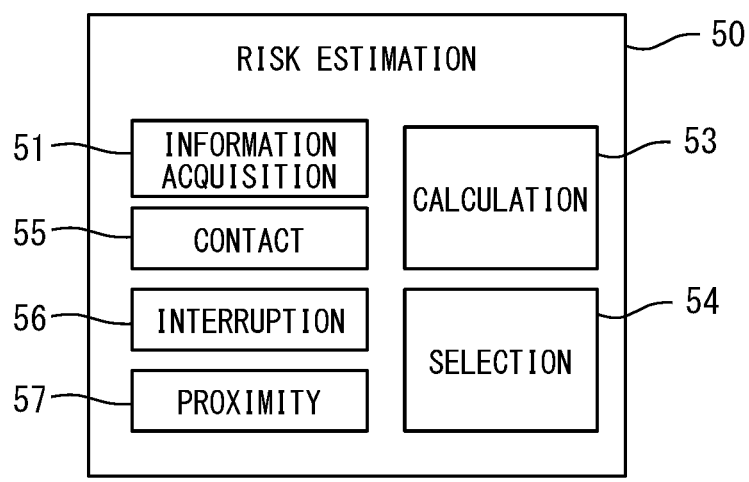
FIG. 2 is a diagram showing functional blocks configured in a risk estimation apparatus.

The functions of the driver assist apparatus according to a first embodiment of the present disclosure are realized by a risk estimation apparatus 50 shown in FIG. 1 and FIG. 2. The risk estimation apparatus 50 is mounted on a vehicle (referred to as a subject vehicle As) together with electronic control units such as a driver status estimator 40, a traveling environment recognition device 60, a vehicle controller 80, an HMI controller 70, and so on, and forms part of an in-vehicle system 100. The risk estimation apparatus 50 and other electronic control units are electrically connected to each other, either directly or indirectly, so that they can communicate with each other. The risk estimation apparatus 50 cooperates with other electronic control units to assist the driver on the subject vehicle As with driving tasks.

The driver status estimator 40 is an electronic control unit that estimates the status of the driver. The driver status estimator 40 includes a computer that includes a processor such as a CPU, and a memory such as a RAM or flash memory. The driver status estimator 40 is electrically connected to a DSM 11, a biological sensor 12, an in-vehicle LAN 13, and so on, directly or indirectly.

The DSM 11 is configured by a camera portion that takes an image of the driver's face, a light source portion that emits near infrared light for the imaging, a controller that controls the camera portion and the light source portion, and so on. The DSM 11 takes an image of the driver's face that allows detection of the driver's gaze direction, face direction, the degree of opening of eye lids and so on, with a predetermined frame rate. The DSM 11 outputs the captured face image data successively to the driver status estimator 40. The DSM stands for a driver status monitor.

The biological sensor 12 gathers biological data such as the heart rate, pulse, body temperature, blood pressure, and so on of the driver. The biological sensor 12 outputs the measured biological data successively to the driver status estimator 40. Measurement results of a large number of in-vehicle sensors included in the in-vehicle system 100 are output to the in-vehicle LAN 13. The driver status estimator 40 can obtain vehicle speed information, for example, indicating the traveling speed of the subject vehicle As, from the in-vehicle LAN 13.

The driver status estimator 40 monitors the status of the driver using the information acquired from the DSM 11, biological sensor 12, and in-vehicle LAN 13, and outputs the monitoring results as driver status information successively to the risk estimation apparatus 50. The status information includes, for example, monitoring results that indicate driver's inattention, a reduced level of wakefulness, and so on.

The traveling environment recognition device 60 is an electronic control unit that recognizes the traveling environment surrounding the subject vehicle As. The traveling environment recognition device 60 includes a computer that includes a processor such as a CPU and GPU, and a memory such as a RAM or flash memory or the like. The traveling environment recognition device 60 is electrically connected to a camera portion 21, a millimeter wave radar 22, a locator 23, a V2X communication device 24, and so on, directly or indirectly. V2X communication may stands for a vehicle-to-everything communication.

The camera portion 21 captures images in an advancing direction of the subject vehicle As and detects a moving object and a stationary object or the like present in the advancing direction from front images. The millimeter wave radar 22 emits millimeter waves toward the advancing direction of the subject vehicle As, and receives millimeter waves reflected by a moving object and a stationary object or the like present in the advancing direction. The millimeter wave radar 22 detects presence or absence, and relative positions, of the moving object and stationary object from the properties of the received millimeter waves. The camera portion 21 and millimeter wave radar 22 detect a moving object such as a pedestrian, a different vehicle Ao (see FIG. 3) or the like, and a stationary object such as a road sign, lane markings or the like, and output the detected object information indicative of the positions and the like of detected moving object and stationary object successively to the traveling environment recognition device 60. The different vehicle Ao may be referred to as another vehicle, the other vehicle.

The locator 23 is configured to include a GNSS receiver, an inertial sensor, a map database, and so on. The GNSS receiver receives positioning signals transmitted from multiple satellites. The inertial sensor measures acceleration acting on the subject vehicle As. The locator 23 determines the position of the subject vehicle As by combining the positioning signals received by the GNSS receiver and the measurement results of the inertial sensor. The locator 23 combines the determined position information of the subject vehicle As with the map information of the surrounding area and outputs the information successively to the traveling environment recognition device 60. The GNSS stands for Global Navigation Satellite System.

The V2X communication device 24 sends and receives information by wireless communication to and from an in-vehicle communication device on the different vehicle Ao (see FIG. 3) and a roadside device set on the road side. The V2X communication device 24 can receive position information, speed information and so on of the different vehicle Ao through vehicle-to-vehicle communication or road-to-vehicle communication. The V2X communication device 24 outputs various received information successively to the traveling environment recognition device 60.

The traveling environment recognition device 60 determines presence or absence and the status of the different vehicle Ao traveling around the subject vehicle As, using the information acquired from the camera portion 21, a millimeter wave radar 22, a locator 23, and a V2X communication device 24. The traveling environment recognition device 60 outputs the information thus determined successively to the risk estimation apparatus 50 as detected information. For example, the detected information includes inter-vehicle distance between the subject vehicle As and a preceding vehicle and distance between the subject vehicle As and a behind vehicle, and TTC (Time-To-Collision) of the subject vehicle As and the preceding vehicle and the behind vehicle. The TTC is a value obtained by dividing the inter-vehicle distance between the subject vehicle As and the different vehicle Ao by a relative speed of the different vehicle Ao with respect to the subject vehicle As. The traveling environment recognition device 60 outputs traveling environment information that indicate road designs and the like around the subject vehicle As successively to the vehicle controller 80, together with the detected information.

The vehicle controller 80 is an electronic control unit that controls the actions of the subject vehicle As. The vehicle controller 80 includes a computer that includes a processor such as a CPU, and a memory device such as a RAM or flash memory. The vehicle controller 80 is electrically connected to an electronic throttle 81, a brake actuator 82, a steering actuator 83, and so on, directly or indirectly. The vehicle controller 80 is configured to execute acceleration, deceleration, braking, and steering of the subject vehicle As by controlling the various actuators. The vehicle controller 80 coordinates with the traveling environment recognition device 60 and exhibits various functions such as ACC, AEB, LTC, and so on by using the detected information of the different vehicle Ao (see FIG. 3) and traveling environment information.

ACC (Adaptive Cruise Control) enables the subject vehicle As to cruise at a constant target speed or to follow a preceding vehicle by controlling acceleration and deceleration. AEB (Automatic Emergency Braking) enables sudden braking for avoiding a collision. LTC (Lane Trace Control) enables the subject vehicle As to keep the lane in which the vehicle is running, by coordination of acceleration/deceleration control and steering control. ACC stands for Adaptive Cruise Control. AEB stands for Automatic Emergency Braking. LTC stands for Lane Trace Control.

The HMI controller 70 is an electronic control unit that controls presentation of information for the driver based on the risk information acquired from the risk estimation apparatus 50. The HMI controller 70 includes a computer that includes a processor such as a CPU and GPU, and a memory such as a RAM or flash memory. The HMI controller 70 is electrically connected to information presentation devices such as an HUD 71, a monitor 72, a speaker 73, a peripheral vision device 74, a haptic device 75, and so on, directly or indirectly. HMI stands for Human Machine Interface. HUD stands for Head Up Display.

The HUD 71 projects image light toward the wind shield of the subject vehicle As. The driver visually perceives the image light reflected by the wind shield inward as a virtual image. The monitor 72 is a display device provided to a navigator, a center display, a combination meter, and so on. The HUD 71 and monitor 72 present visual information through display of images.

The speaker 73 is installed in front pillars on the left side and right side of the subject vehicle As, for example. The speaker 73 outputs a highly directional ultrasound toward the vicinity of a head rest of the driver's seat. The speaker 73 produces an audible sound by creating a distortion in the ultrasound propagating through the air. The speaker 73 reproduces a voice that is audible basically only to the driver, among the members on the subject vehicle As. The speaker 73 presents information through hearing by reproduction of a voice.

The peripheral vision device 74 includes multiple light-emitting regions 74a and 74b (see FIG. 4 to FIG. 6) in a linear shape. The light-emitting region 74a is positioned at the top of the instrument panel and extends from one side to the other side in the width direction of the subject vehicle As between the pair of front pillars. The light-emitting region 74b is positioned at the top of a side door and extends along the front-to-back direction of the subject vehicle As. Light-emitting spots 74c are illuminated in each of the light-emitting regions 74a and 74b. The light-emitting spots 74c are movable in each light-emitting region 74a or 74b, and can be extended along each light-emitting region 74a or 74b. The light-emitting spots 74c are perceived in a peripheral vision of the driver facing toward the advancing direction, and induce the driver to look toward the direction of an object that is needed to be drawn attention to.

The haptic device 75 is a piece of equipment that generates vibration, for example. The haptic device 75 is set in the steering wheel, accelerator pedal, brake pedal, seat surface of the driver's seat, seat belt, etc., for example, at positions that come into contact with the driver. The haptic device 75 presents information through haptic sense by generation of vibration.

The HMI controller 70 determines the alarm level and alarm timing of the information to be presented based on the risk information. For example, the alarm level is set to one of "low", "medium", and "high". The HMI controller 70 selects an information presentation device to be activated in accordance with the alarm level, and changes the operation contents of various information presentation devices (see FIG. 7).

Figure 4:
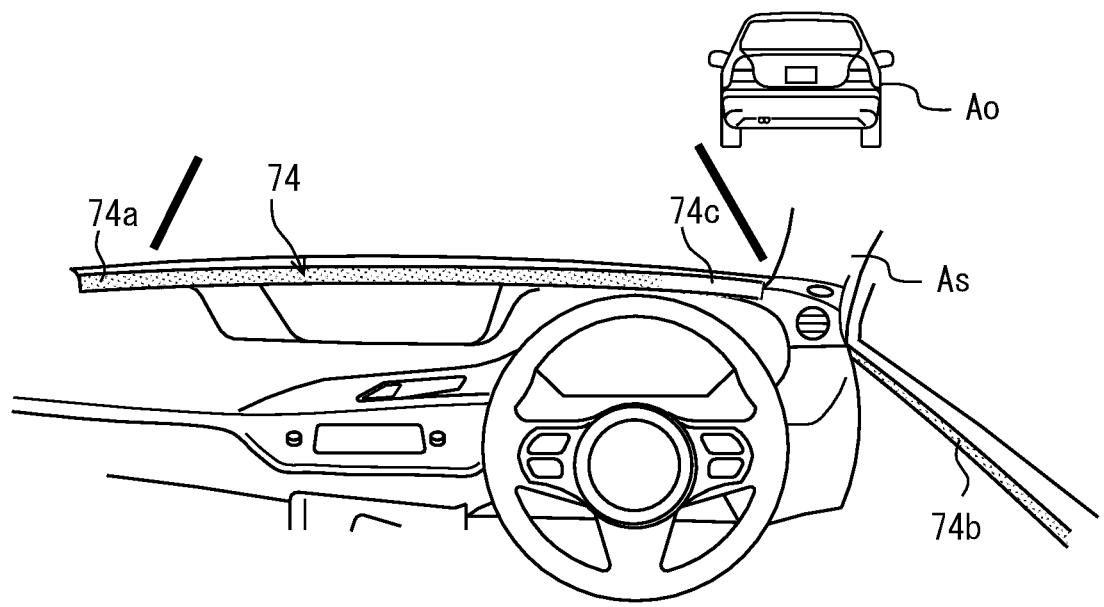
FIG. 4 is a diagram showing one example of alarm presentation using a peripheral vision device.

For example, as shown in FIG. 4, the HMI controller 70 illuminates the light-emitting spot 74c before the different vehicle Ao cuts in front of the subject vehicle As from an adjacent lane to alert the driver. Such presentation of information prevents the driver who is manually driving the vehicle from overlooking the different vehicle Ao cutting in and can perform protective driving.

Figure 5:
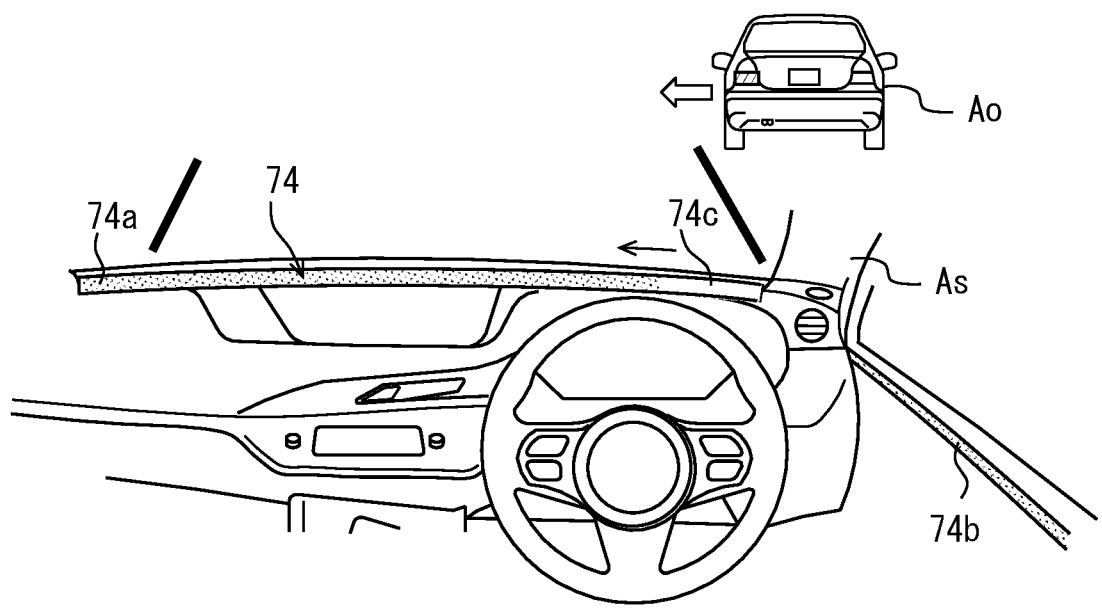
FIG. 5 is a diagram showing one example of alarm presentation using a peripheral vision device.
Figure 6:
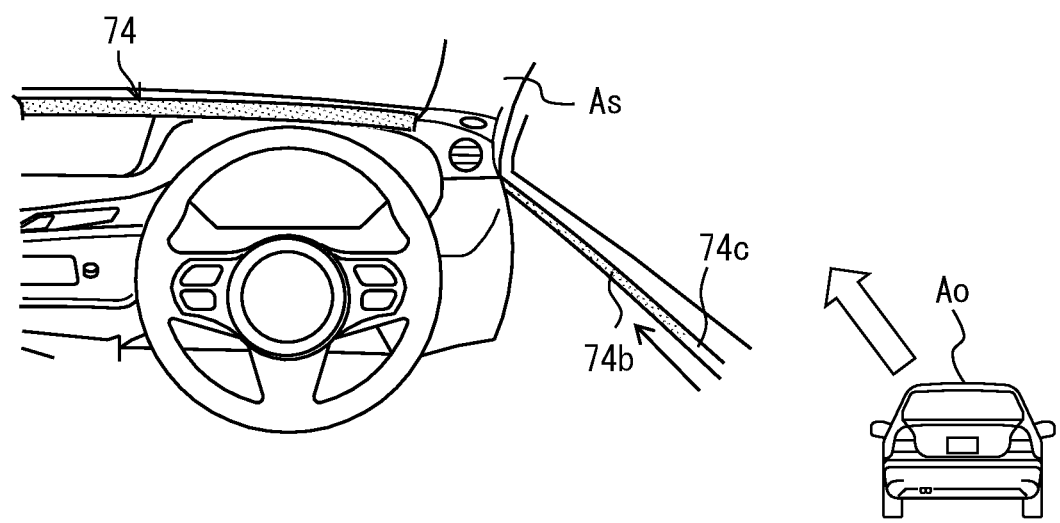
FIG. 6 is a diagram showing one example of alarm presentation using a peripheral vision device.

When the different vehicle Ao starts a movement to cut in front of the subject vehicle As shown in FIG. 5, the peripheral vision device 74 repeats moving or extending the light-emitting spot 74c along a moving direction of the different vehicle Ao in the light-emitting region 74a of the instrument panel. Also, when the different vehicle Ao is approaching from behind on one side as shown in FIG. 6, the peripheral vision device 74 repeats moving or extending the light-emitting spot 74c along a moving direction of the different vehicle Ao in the light-emitting region 74b of the side door.

The risk estimation apparatus 50 shown in FIG. 1 and FIG. 2 is an electronic control unit that calculates risks imposed on the subject vehicle As by the different vehicle Ao and determines the necessity and contents of information to be presented and of the control of the vehicle. The risk estimation apparatus 50 includes a computer that includes a processor 151 such as a CPU, and a memory 152 such as a RAM or flash memory. The memory 152 stores various programs including a driver assist program such as to be readable by the processor 151. The risk estimation apparatus 50 has multiple functional blocks that are realized by the processor 151 executing the driver assist program stored in the memory 152. More specifically, functional blocks such as an information acquisition section 51, a calculation section 53, a selection section 54, a contact determination section 55, a merging determination section 56, a proximity determination section 57, etc., are configured in the risk estimation apparatus 50.

Figure 8:
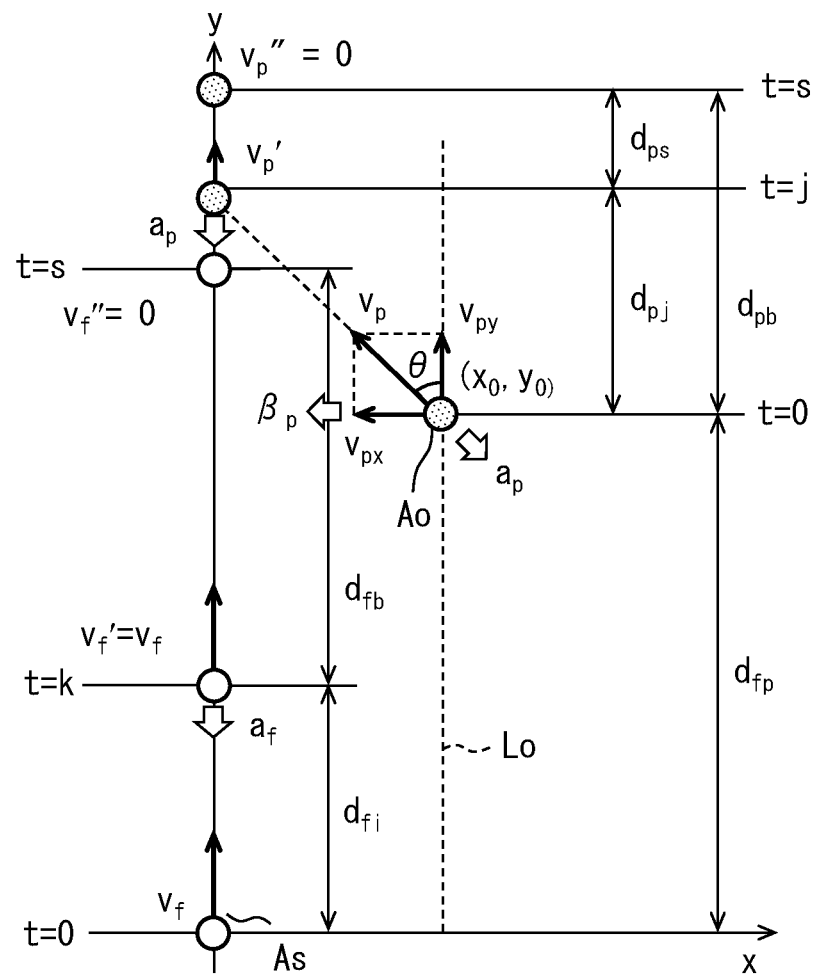
FIG. 8 is a diagram explaining the concept of mathematical expressions for calculating an inter-vehicle risk distance.

In the following description, the relationship between the subject vehicle As and the different vehicle Ao relative to each other will be explained with reference to FIG. 8. FIG. 8 shows a spatial coordinate system defined in the traveling environment recognition device 60 and having the position of the subject vehicle As as the reference point. The x-axis is defined to extend along a lateral direction of the subject vehicle As, and the y-axis is defined to extend in the front-to-back direction of the subject vehicle As. The x-y plane is parallel to the road surface. The broken line in FIG. 8 is an imaginary line Lo that is parallel to the y-axis and passes through the different vehicle Ao. In the following calculation process, it is assumed that the front-to-back direction of the different vehicle Ao coincides with the imaginary line Lo, and the lateral direction of the different vehicle Ao coincides with the x-axis.

The information acquisition section 51 obtains the information on the status of the driver on the subject vehicle As from the driver status estimator 40. The information acquisition section 51 obtains the detected information on the different vehicle Ao driving around the subject vehicle As from the traveling environment recognition device 60. The information acquisition section 51 obtains, as the detected information, a relative position $x_0$ in the lateral direction of the different vehicle Ao, a relative position $y_0$ in the front-to-back direction of the different vehicle Ao, and a traveling speed $v_{py}$ of the different vehicle Ao. The information acquisition section 51 obtains the traveling speed $v_f$ of the subject vehicle As. These relative positions $x_0$ and $y_0$ and traveling speeds $v_{py}$ and $v_f$ are the actual measured values used for the risk estimation.

The calculation section 53 calculates a risk estimation value indicative of the risk imposed on the subject vehicle As by the different vehicle Ao. The risk estimation value indicates the level of the risk of contact between the different vehicle Ao and the subject vehicle As. The calculation section 53 calculates a risk estimation value on an assumption that the different vehicle Ao that is not present on the expected course P of the subject vehicle As will move into this expected course P. The calculation section 53 calculates an inter-vehicle risk distance, which is one example of risk estimation value. The inter-vehicle risk distance is an inter-vehicle distance that allows the subject vehicle As to stop without contacting the different vehicle Ao that has moved into the expected course P.

The calculation section 53 sets multiple assumed values for the calculation of the risk estimation value. The calculation section 53 calculates the risk estimation value using both of the actual measured values and assumed values. The assumed values include acceleration $a_f$ generated in the subject vehicle As, and accelerations $a_p$, $\beta_p$ generated in the different vehicle Ao. The calculation section 53 sets an assumed value k of driver's expected non-braking time based on the driver status information. The calculation section 53 calculates the inter-vehicle risk distance D using the mathematical expression shown in Formula 1 based on the actual measured values and assumed values. Angle θ in the expression below is the angle made by the velocity vector [$v_f$] of the subject vehicle As and the velocity vector [$v_p$] of the different vehicle Ao. In other words, angle θ is the angle made by the velocity vector [$v_{py}$] in the front-to-back direction of the different vehicle Ao defined along the imaginary line Lo and the velocity vector [$v_p$] of the different vehicle Ao.

$$D = v_f \cdot k - \frac{v_f^2}{2a_f} + \frac{v_p'^2}{2a_p} - \frac{v_p'^2 - v_p^2}{2a_p}\cos\theta \quad \text{[Formula 1]}$$

The mathematical expression above assumes that the different vehicle Ao reduces speed with an acceleration $a_p$ and enters the expected course P with a lateral acceleration $\beta_p$, while the subject vehicle As reduces speed with an acceleration $a_f$ to avoid the different vehicle Ao to be a risk object. More specifically, if the sum of the non-braking distance $d_{fi}$ and the braking distance $d_{fb}$ of the subject vehicle As is below the sum of the inter-vehicle distance $d_{fp}$ and the braking distance $d_{pb}$ of the different vehicle Ao, no contact can occur between the subject vehicle As and the different vehicle Ao (see FIG. 8 and Formula 2).

$$(d_{fp} + d_{pb}) > (d_{fi} + d_{fb})$$

$$d_{fp} > d_{fi} + d_{fb} - d_{pb} = d_{fi} + d_{fb} - (d_{ps} + d_{pj}) \quad \text{[Formula 2]}$$

In the formula above, $d_{pj}$ represents the moving distance in the front-to-back direction of the different vehicle Ao during the lateral movement, and $d_{ps}$ represents the moving distance in the front-to-back direction of the different vehicle Ao after the lateral movement. The moving distances are each expressed by the equations in Formula 3.

$$d_{fi} = v_f \cdot k \quad \text{[Formula 3]}$$

$$d_{fb} = -\frac{v_f^2}{2a_f}$$

$$d_{ps} = -\frac{v_p'^2}{2a_p}$$

$$d_{pj} = \frac{v_p'^2 - v_p^2}{2a_p}\cos\theta$$

The non-braking time k here, as well as in Formula 4, is the sum of a standard driver's reaction time RT and a reaction delay time RDT caused by a change in the driver's status. The reaction time RT is a constant value set in association with driver's individual differences. The individual differences that may be adopted here include driving skills and reflexes. These individual differences are set based on estimation results of the driver's age, sex, and so on using the DSM 11 (see FIG. 1), for example. That is, the reaction time RT is set in association with the detection results of the DSM 11.

The reaction delay time RDT is the time of delay in reaction that may occur with a change in the driver's status, and it is an assumed value set based on the status information. The reaction delay time RDT is renewed as required and changes with time, based on the gaze direction, wakefulness level, inattention level, fatigue level, and so on as indicated by the status information. The calculation section 53 can set the reaction delay time RDT based on mathematical expressions or the like representing the correlation between various values as given by the status information and the reaction delay time RDT. The reaction delay time RDT is set larger when the driver is inattentive than when the driver is facing front. The reaction delay time RDT is set larger as the wakefulness level is decreased, or the inattention level and fatigue level are increased.

$$k = RT + RDT \quad \text{[Formula 4]}$$

Figure 9A:
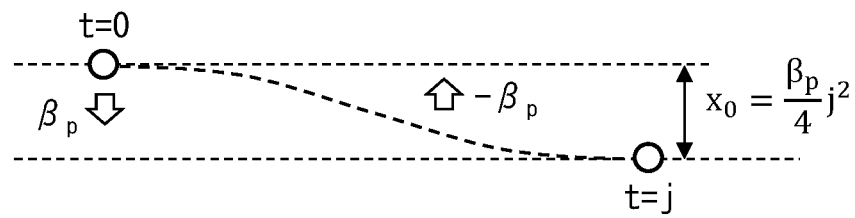
FIG. 9A is a diagram explaining a lateral movement of a different vehicle assumed by the calculation section.
Figure 9B:
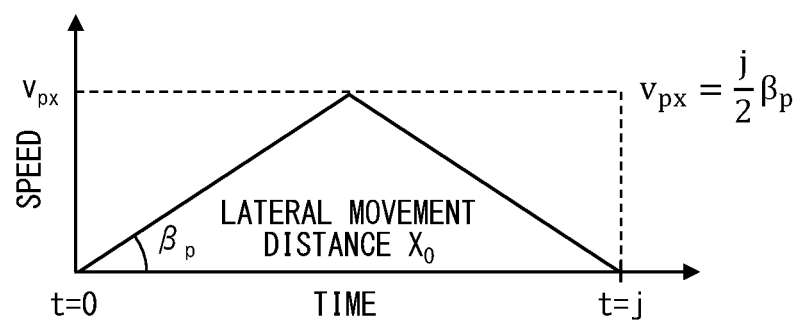
FIG. 9B is a diagram for explaining a lateral movement of the different vehicle assumed by the calculation section.

The calculation section 53 further assumes the lateral movement of the different vehicle Ao (see FIG. 9A and FIG. 9B). This assumption enables calculation of the lateral movement continuation time j (see FIG. 8). Consequently, the traveling speeds vp and vp' and cos θ of the different vehicle Ao can be expressed as follows, using the actual measured values and assumed values described above. This way, the inter-vehicle risk distance D is calculated from the actual measured values and assumed values.

$$j = 2\sqrt{\frac{x_0}{\beta_p}} \text{ from } x_0 = \frac{\beta_p}{4}j^2 \quad \text{[Formula 5]}$$

$$v_{px} = \sqrt{\beta_p x_0} \text{ from } v_{px} = \frac{j}{2}\beta_p$$

$$v_p = \sqrt{\beta_p x_0 + v_{py}^2} \because v_p > 0 \text{ from } v_p^2 = v_{px}^2 + v_{py}^2$$

$$v_p' = \sqrt{\beta_p x_0 + v_{py}^2} + 2a_p\sqrt{\frac{x_0}{\beta_p}} \text{ from } v_p' = v_p + a_p j$$

$$\cos\theta = \frac{v_{py}}{\sqrt{\beta_p x_0 + v_{py}^2}} \text{ from } \cos\theta = \frac{v_{py}}{v_p}$$

The calculation section 53 calculates a risk estimation value with respect to the different vehicle Ao traveling on the expected course P, and a risk estimation value with respect to the different vehicle Ao that is not present on the expected course P, using the same expression (see Formula 1). If $x_0 = 0$, then the expression for calculating the inter-vehicle risk distance D shown in Formula 1 will be as shown in Formula 6. Therefore, the expression of Formula 1 is applicable also to the different vehicle Ao driving in the same lane.

$$D = v_f \cdot k - \frac{v_f^2}{2a_f} + \frac{v_p^2}{2a_p} \quad \text{[Formula 6]}$$

The calculation section 53 calculates a time allowance $R_A$, instead of or in addition to the inter-vehicle risk distance D, as a risk estimation value. The time allowance $R_A$ is the time that allows the subject vehicle As to stop without contacting the different vehicle Ao that has moved into the expected course P. The calculation section 53 calculates the time allowance $R_A$ using the following expression based on the actual measured values and assumed values that are substantially the same as those used for calculating the inter-vehicle risk distance.

$$R_A = \frac{y_0}{v_f} - \left\{ k - \frac{v_f}{2a_f} + \frac{v_p'^2}{2v_f a_p} - \frac{v_p'^2 - v_p^2}{2v_f a_p} \cos\theta \right\} \quad \text{[Formula 7]}$$

The selection section 54 selects driver assist content corresponding to the risk estimation value calculated by the calculation section 53. When the ACC and LTC features are inactivated, the selection section 54 carries out a driver assist process of presenting an alarm to the driver informing of the approach of the different vehicle Ao. For example, when an inter-vehicle risk distance D has been calculated by the calculation section 53, the selection section 54 selects driver assist content based on a comparison between the inter-vehicle risk distance D and the actual inter-vehicle distance. The shorter the inter-vehicle distance relative to the inter-vehicle risk distance D is, the higher the level of alarm (see FIG. 7) to the driver selected by the selection section 54 becomes.

Figure 3:
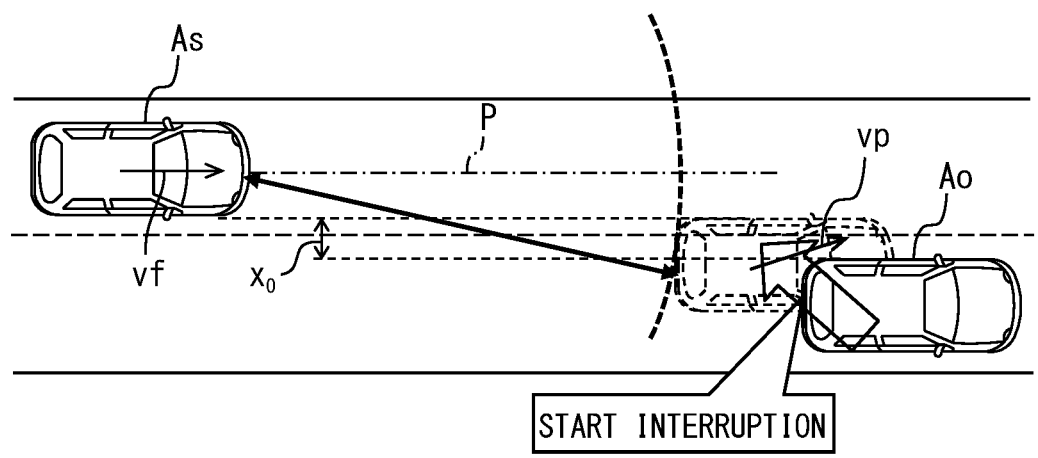
FIG. 3 is a diagram showing one example of a different vehicle that is an intended target in driver assistance.

A basic driver assist process in one mode where an inter-vehicle risk distance D is calculated by the calculation section 53 will be described below in detail based on FIG. 10 and with reference to FIG. 1 and FIG. 3. The driver assist process is started by the risk estimation apparatus 50 upon the ignition of the subject vehicle As being turned on, for example, and repeated until the ignition is turned off.

At S101, information necessary for the risk estimation, i.e., information necessary for the calculation of the inter-vehicle risk distance D, is acquired, and the process goes to S102. At S101, the current inter-vehicle distance between the subject vehicle As and the different vehicle Ao is also obtained. At S102, the inter-vehicle risk distance D is calculated based on the information acquired at S101, and the process goes to S103.

At S103, the current inter-vehicle distance obtained at S101 and the inter-vehicle risk distance D calculated at S102 are compared. If the current inter-vehicle distance is longer than the inter-vehicle risk distance D, it is determined that no driver assistance is necessary, and the driver assist process is ended temporarily. If it is determined that the current inter-vehicle distance is shorter than the inter-vehicle risk distance D, it is determined that driver assistance is needed, and the process goes from S103 to S104.

At S104, driver assist content is selected based on the comparison result at S103 and the information acquired at S101, and the process goes to S105. At S105, a control signal to be output to at least one of the HMI controller 70 and the vehicle controller 80 is generated so that the driver assist content selected at S104 is carried out. The generated control signal is output, and the driver assist process is ended.

Figure 11:
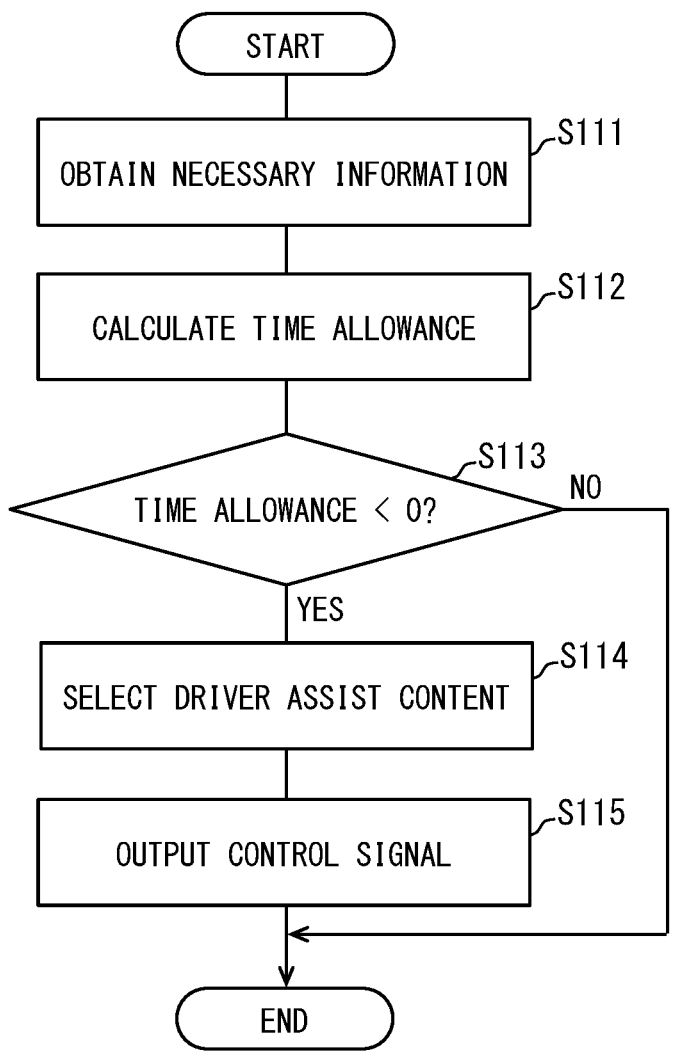
FIG. 11 is a flowchart showing the details of a driver assist process based on a time allowance.

A basic driver assist process in one mode where a time allowance $R_A$ is calculated by the calculation section 53 will be described below in detail based on FIG. 11 and with reference to FIG. 1.

At S111, information necessary for the risk estimation, i.e., information necessary for the calculation of the time allowance $R_A$ is acquired, and the process goes to S112. At S112, the time allowance $R_A$ is calculated based on the information acquired at S111, and the process goes to S113.

At S113, whether the time allowance $R_A$ calculated at S112 is a positive value or a negative value is determined. If the time allowance $R_A$ is a positive value, it is determined that no driver assistance is necessary, and the driver assist process is ended temporarily. If the time allowance $R_A$ is not more than 0, it is determined that driver assistance is needed, and the process goes from S113 to S114.

At S114, driver assist content is selected based on the time allowance $R_A$ calculated at S113, and the process goes to S115. The smaller the time allowance $R_A$ is, the more the level of alarm (see FIG. 7) to the driver is increased. At S115, a control signal for giving an instruction on execution of the driver assistance selected at S114 is generated, and output to at least one of the HMI controller 70 and the vehicle controller 80, after which the driver assist process is ended.

(Contact Determination)

A contact determination section 55 (see FIG. 1) determines whether the different vehicle Ao will contact the subject vehicle As that keeps running at the current traveling speed. More specifically, it is assumed that the subject vehicle As keeps running at a traveling speed $v_f$, and that the different vehicle Ao will move laterally at a speed $v_{px}$, as shown in FIG. 12. If the subject vehicle As that keeps running at the constant speed will be able to pass along the side of the different vehicle Ao, the different vehicle Ao is not regarded as a risk object. If the subject vehicle As reduced speed in this case, the different vehicle Ao could contact the subject vehicle As. The contact determination section 55 calculates whether there could be a blending point between the subject vehicle As and the different vehicle Ao in such an expected scene.

Figure 13:
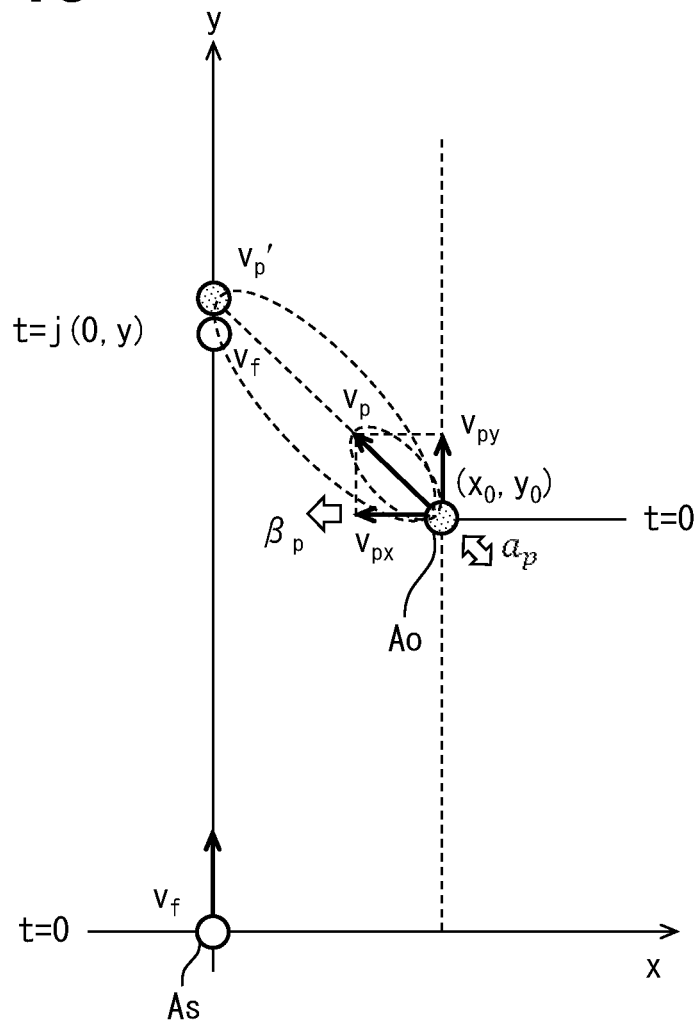
FIG. 13 is a diagram explaining the concept of calculation for determination of contact.

The following relational expressions are established for each of the subject vehicle As and the different vehicle Ao, where x and y represent a possible merging point of the different vehicle Ao, as shown in FIG. 13.

$$\begin{cases} v_{fx} j = x \\ v_{fy} j = y \\ v_{fx}^2 + v_{fy}^2 = v_f^2 \end{cases} \quad \text{[Formula 8]}$$

$$\begin{cases} x_0 + \frac{\beta_p}{4} j^2 = x \\ y_0 + \left( v_p j + \frac{a_p}{2} j^2 \right) \cos\theta = y \\ v_{px}^2 + v_{py}^2 = v_p^2 \end{cases}$$

Here, $v_{fx}=0$, $x=0$, and $\cos\theta = v_{py}/v_p$. The following equation is deduced from the two relational expressions for y in Formula 8.

$$y_0 + \left( v_p j + \frac{a_p}{2} j^2 \right) \frac{v_{py}}{v_p} = v_f j \quad \text{[Formula 9]}$$

Squaring both sides of the equation shown in Formula 9 and rearranging the equation with respect to $a_p$ leads to the following formula.

$$\frac{v_{py}^2 j^2}{4 v_p^2} a_p^2 + \left( \frac{v_{py}^2}{v_p} j^3 + \frac{y_0 v_{py}}{v_p} j^2 \right) a_p + (y_0 + v_{py} j)^2 - v_f^2 j^2 = 0 \quad \text{[Formula 10]}$$

From the relational equations shown in Formula 5, j and $v_p$ in the equation above that are neither an actual measured value nor an assumed value can be expressed as follows.

$$j = 2\sqrt{\frac{x_0}{\beta_p}}, v_p = \sqrt{\beta_p x_0 + v_{py}^2} \qquad \text{[Formula 11]}$$

The solution for $a_p$ can be obtained by applying the equation of Formula 11 to the equation of Formula 10. The contact determination section 55 determines that there is a contact possibility if the solutions, when the discriminant of the equation of Formula 10 is not less than 0, are within a specified range ($th_1 < a_p < th_2$). The specified range is predetermined to a range of about ±0.4 G, for example. If the different vehicle Ao is running in the same lane as the subject vehicle As, $x_0 = 0$, and the discriminant always equals to zero.

Figure 14:
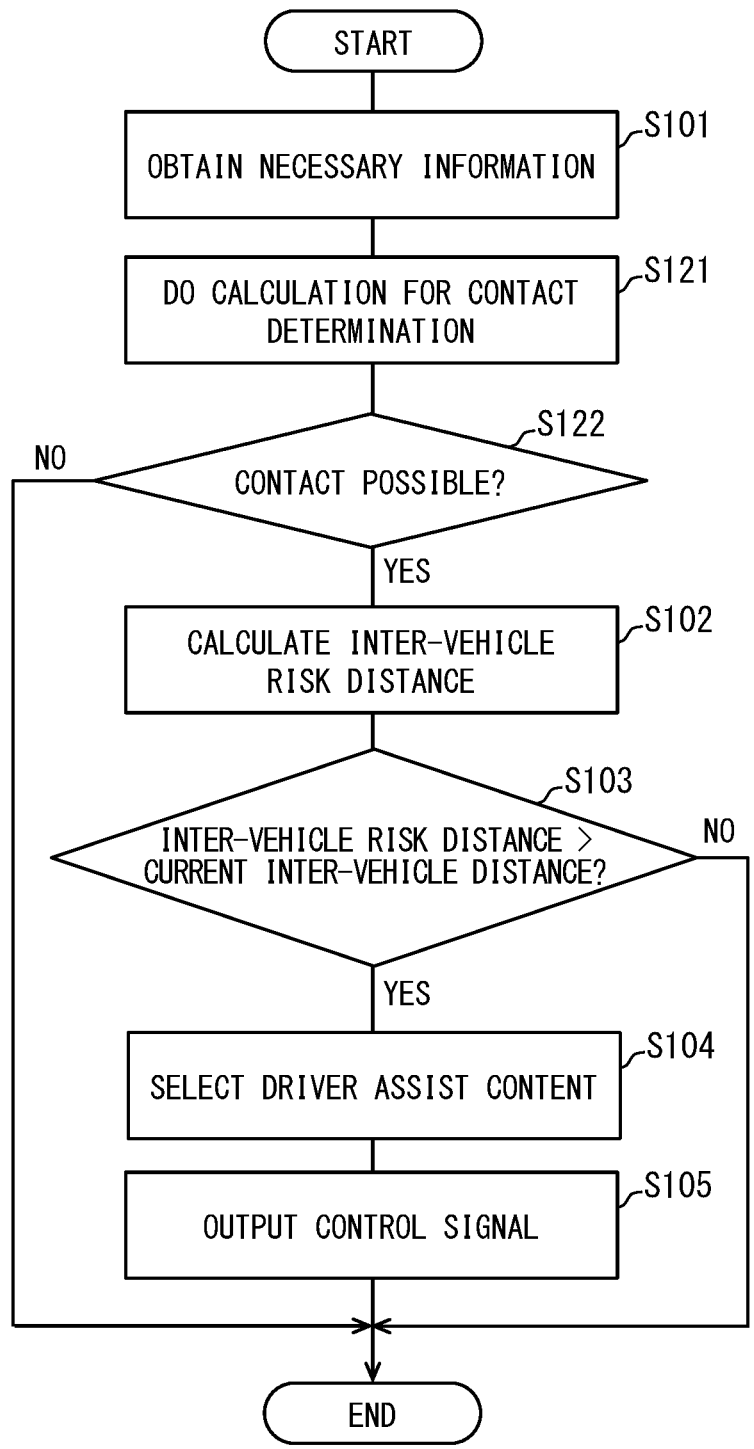
FIG. 14 is a flowchart showing the details of a driver assist process when contact determination is positive.

If it is determined that the different vehicle Ao will not contact the subject vehicle As based on the calculations above, the selection section 54 cancels execution of driver assistance with respect to the different vehicle Ao. A driver assist process when contact determination by the contact determination section 55 is positive will be described below based on FIG. 14 and with reference to FIG. 12. The process steps from S101 to S105 are substantially the same as the driver assist process of FIG. 10.

At S121, calculations are carried out for contact determination based on the information acquired at S101, and the process goes to S122. At S122, whether there is a possibility of contact with the different vehicle Ao is determined based on the value of the solution for the acceleration $a_p$ of the different vehicle Ao. If it is determined at S122 that there is no possibility of contact, it is assumed that alerting is not applicable in the current scene, and the driver assist process is ended. If it is determined at S122 that there is a possibility of contact, the process goes to S102. Driver assistance is then performed through the steps from S102 to S105 based on a comparison between the inter-vehicle risk distance D and the current inter-vehicle distance.

(Merging Determination and Merging Possibility Determination)

A merging determination section 56 (see FIG. 2) determines whether the different vehicle Ao running in an adjacent lane will cut into an expected course P of the subject vehicle As. The merging determination section 56 determines whether the different vehicle Ao running in an adjacent lane ahead of the subject vehicle As is a merging vehicle Ai that will cut into the expected course P. The merging vehicle Ai may be referred to as an interruption vehicle.

Figure 15:
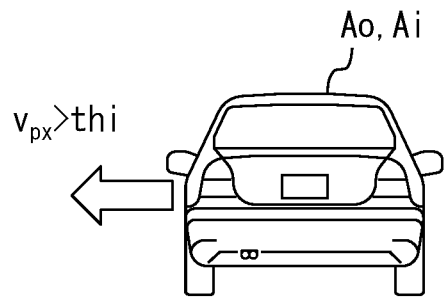
FIG. 15 is a diagram showing one example of merging determination.
Figure 16:
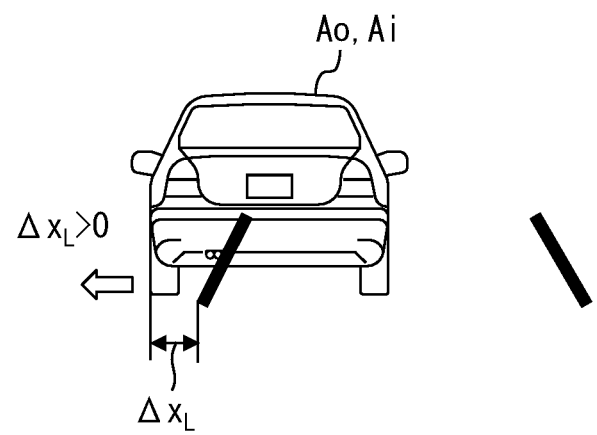
FIG. 16 is a diagram showing another example of merging determination.
Figure 17:
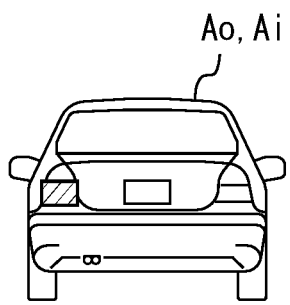
FIG. 17 is a diagram showing a further example of merging determination.

More specifically, if the lateral speed $v_{px}$ of the different vehicle Ao laterally moving toward the expected course P of the subject vehicle As exceeds a predetermined merging threshold thi (see FIG. 15), the merging determination section 56 determines that the different vehicle Ao is a merging vehicle Ai. If the different vehicle Ao crosses over lane markings that divide the lane on which the subject vehicle is traveling and the adjacent lane, and the overlap amount $\Delta x_L$ of the different vehicle Ao becomes positive (see FIG. 16), the merging determination section 56 determines that the different vehicle Ao is a merging vehicle Ai. The merging determination section 56 determines that the different vehicle Ao is a merging vehicle Ai based on a fact that the directional indicator of the different vehicle Ao has started blinking (see FIG. 17).

Figure 18:
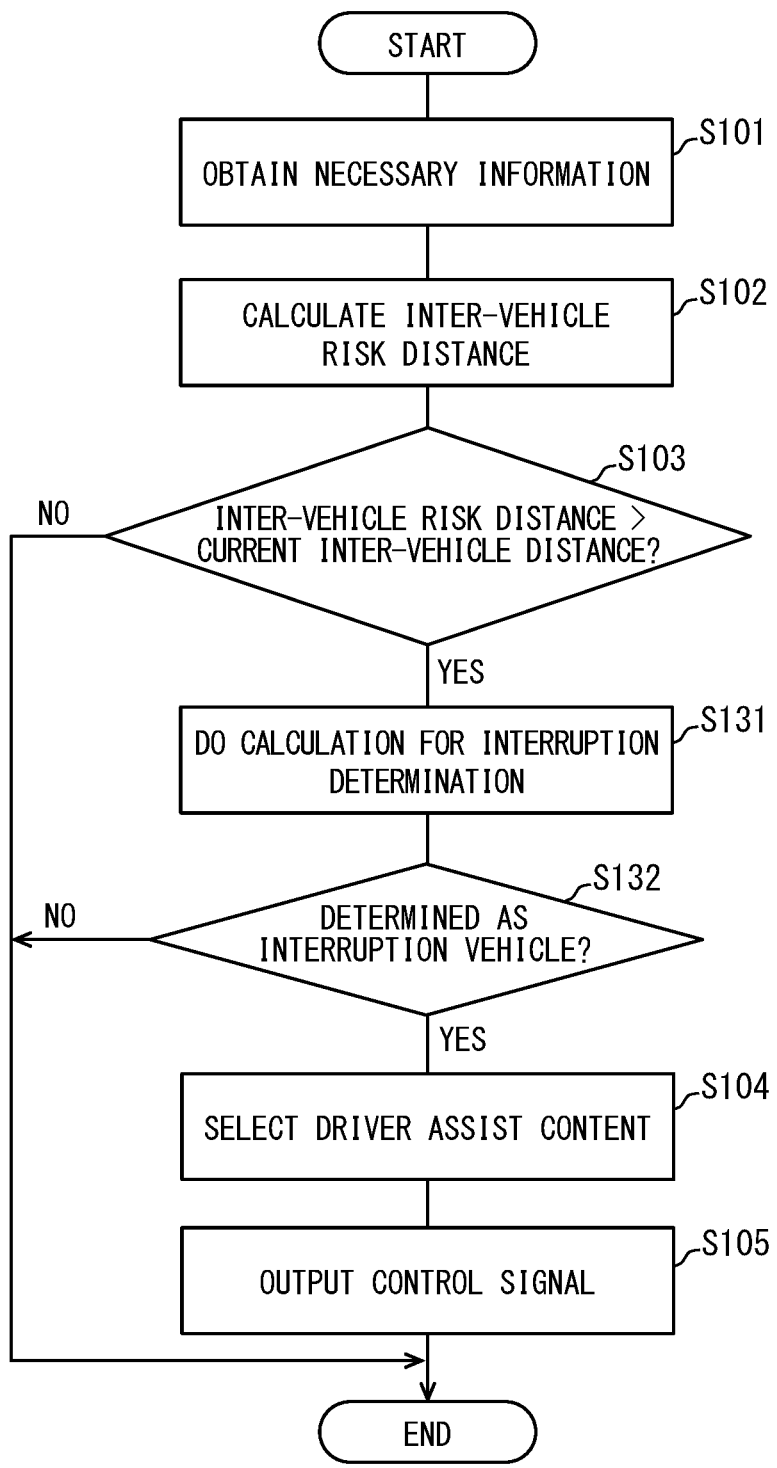
FIG. 18 is a flowchart showing the details of a driver assist process when merging determination is positive.

The selection section 54 (see FIG. 2) cancels presentation of an alarm with respect to the different vehicle Ao that is not recognized as a merging vehicle Ai. If the driver is alerted to all different vehicle Ao that have come nearer to the subject vehicle As than the inter-vehicle risk distance D, the driver may find the alert annoying. A driver assist process when merging determination by the merging determination section 56 is positive will be described below in detail based on FIG. 18 and with reference to FIG. 15. The process steps from S101 to S105 are substantially the same as the driver assist process of FIG. 10.

At S131, when the current distance from the different vehicle Ao was determined to be less than the inter-vehicle risk distance D at S103, calculations are performed for determining whether the different vehicle Ao is a merging vehicle Ai, and the process goes to S132. At S132, the calculation results at S131 are referred to, so as to determine whether the different vehicle Ao is a merging vehicle Ai. If it is determined at S132 that the different vehicle Ao is not a merging vehicle Ai, the driver assist process is ended. The issuance of an alarm as driver assistance is canceled. If it is determined at S132 that the different vehicle Ao is a merging vehicle Ai, S104 and S105 are carried out. An alarm indicating the presence of a merging vehicle Ai is presented through the steps above.

Next, determination of merging possibility will be described in detail.

Before carrying out a merging determination process, the merging determination section 56 shown in FIG. 2 determines whether this is the scene where it is possible that the different vehicle Ao may cut in front of the subject vehicle As. If the different vehicle Ao is highly likely to become a merging vehicle Ai, driver assistance such as presentation of an alarm is started before the different vehicle is determined as a merging vehicle Ai. One scene where the merging determination section 56 determines that there is a possibility of merging will be described below.

Figure 19:
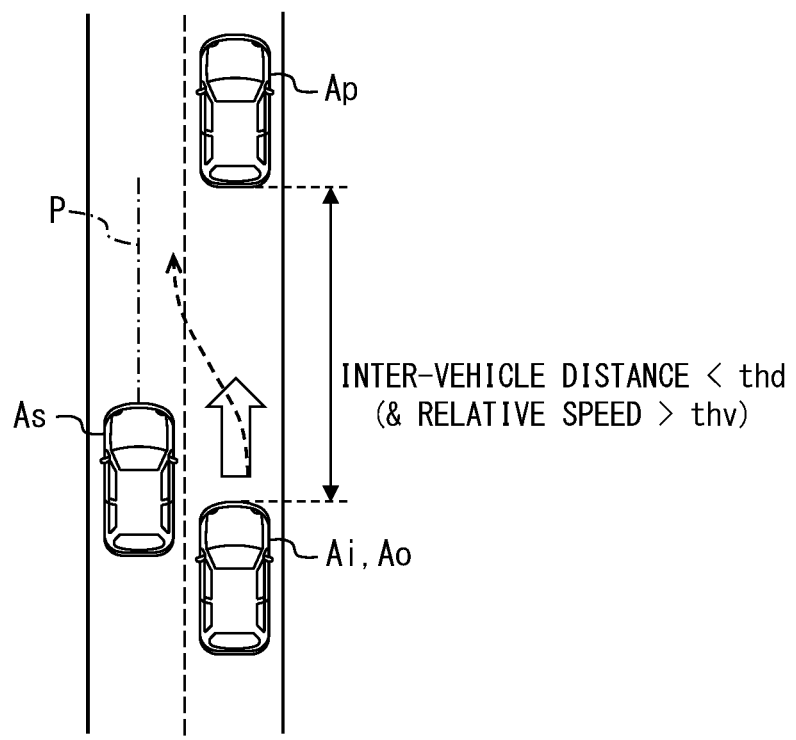
FIG. 19 is a diagram showing one example of a scene where it is determined that there is a possibility of merging.

As shown in FIG. 19, when a side-by-side vehicle Ap is driving in the adjacent lane next to the subject vehicle As, and a behind vehicle driving at higher speed than the side-by-side vehicle Ap is approaching the side-by-side vehicle Ap, it is likely that this behind vehicle, hindered by the side-by-side vehicle Ap, will cut into an expected course P of the subject vehicle As. Therefore, the merging determination section 56 determines that the behind vehicle can probably become a merging vehicle Ai, based on the inter-vehicle distance between the side-by-side vehicle Ap and the behind vehicle. More specifically, the merging determination section 56 recognizes the behind vehicle as a merging vehicle Ai that may possibly cut in, based on a fact that the inter-vehicle distance falls below an inter-vehicle distance threshold thd.

The merging determination section 56 may additionally use the relative speed of the behind vehicle with respect to the side-by-side vehicle Ap for the determination of merging possibility. More specifically, the merging determination section 56 recognizes the behind vehicle as a merging vehicle Ai that may possibly cut in, when, in addition to the fact that the inter-vehicle distance has been reduced, the relative speed of the behind vehicle with respect to the side-by-side vehicle Ap exceeds a speed threshold thv.

Figure 20:
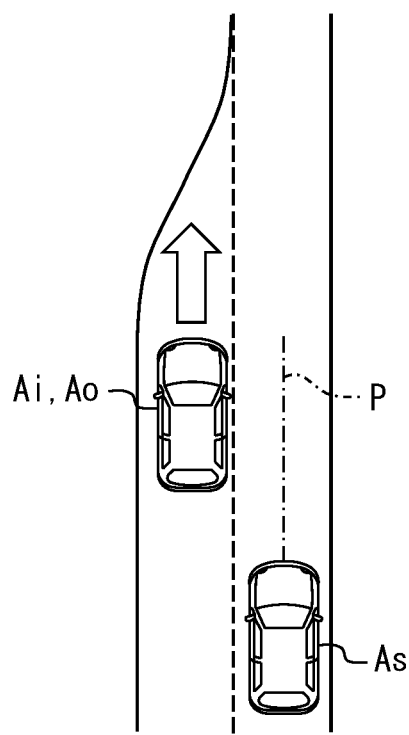
FIG. 20 is a diagram showing another example of a scene where it is determined that there is a possibility of merging.

At a merging point where the adjacent lane merges the lane on which the subject vehicle As is traveling, as shown in FIG. 20, it is highly likely that the different vehicle Ao driving in the adjacent lane will become a merging vehicle Ai that cuts into the expected course P of the subject vehicle As. Therefore, the merging determination section 56 determines that there is a possibility of the different vehicle Ao cutting in, when the adjacent lane in which the different vehicle Ao is driving merges ahead, based on the road design indicated by the traveling environment information.

Figure 21:
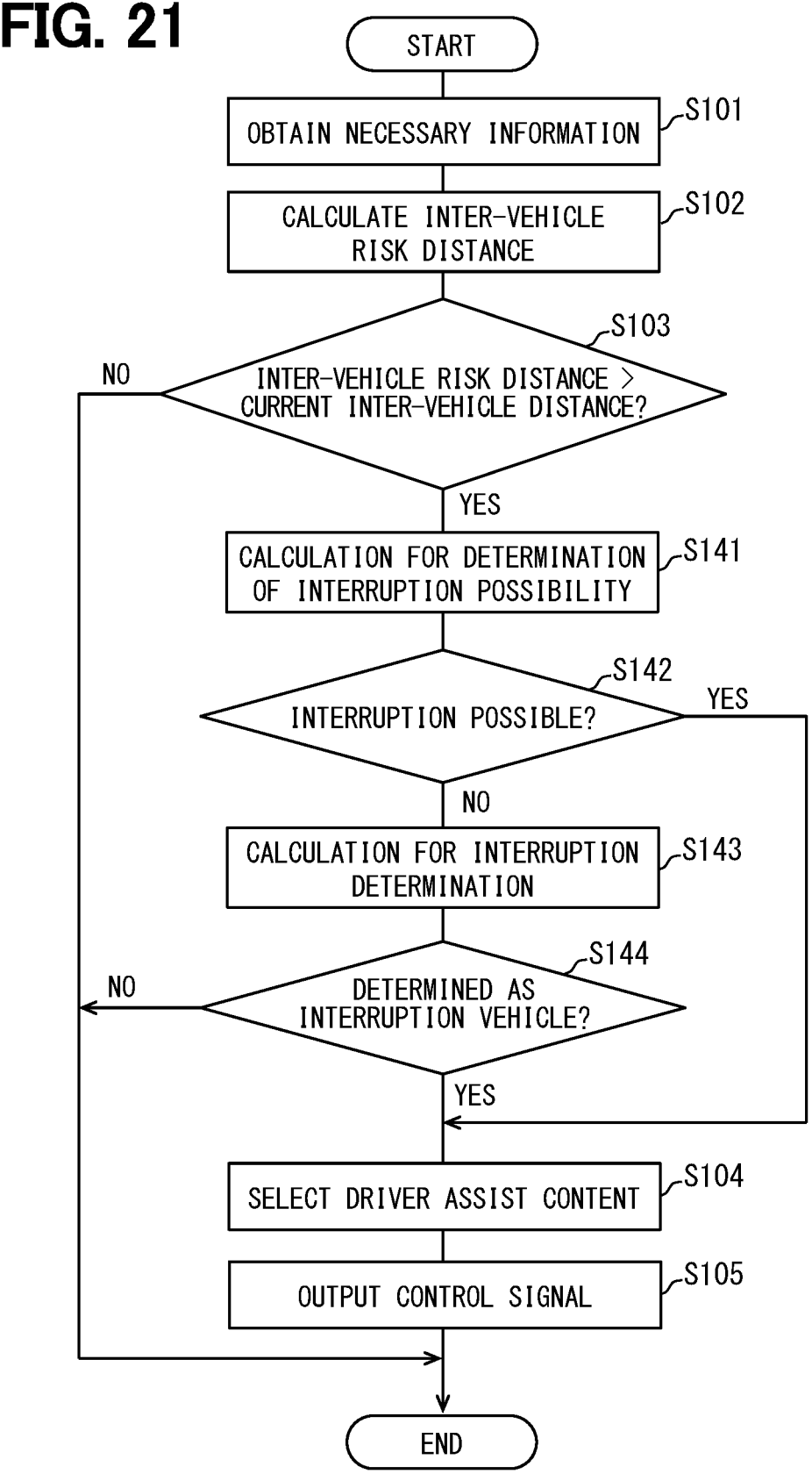
FIG. 21 is a flowchart showing the details of a driver assist process when merging determination and merging possibility determination are positive.

The selection section 54 shown in FIG. 2 executes presentation of an alarm indicating the presence of the different vehicle Ao when the merging determination section 56 has determined that there is a possibility of the different vehicle Ao cutting in. A driver assist process when merging determination as well as merging possibility determination are positive will be described below in detail based on FIG. 21 and with reference to FIG. 19. The process steps from S101 to S105 are substantially the same as the driver assist process of FIG. 10.

When the current inter-vehicle distance was determined to be less than the inter-vehicle risk distance D at S103, calculations are performed at S141 for determining whether it is possible that the different vehicle Ao may become a merging vehicle Ai, and the process goes to S142. At S142, it is determined whether there is a possibility of the different vehicle Ao cutting in, based on the calculation results at S141. If it is determined at S142 that the different vehicle Ao may cut in, S143 and S144 are skipped and the process goes to S104. An alarm indicating the presence of the different vehicle Ao is presented through the steps of S104 and S105.

If it is not determined at S142 that there is a possibility of merging, the process goes to S143. Through the steps S143 and S144, it is determined whether the different vehicle Ao is a merging vehicle Ai. If the different vehicle Ao is determined as a merging vehicle Ai, an alarm indicating the presence of a merging vehicle Ai is presented through the steps S104 and S105.

(Proximity Determination and Proximity Possibility Determination)

A proximity determination section 57 shown in FIG. 2 determines whether the different vehicle Ao is approaching the subject vehicle As. The proximity determination section 57 determines that the different vehicle Ao is approaching the subject vehicle As based on the fact that the TTC between the subject vehicle As and the different vehicle Ao, calculated by the traveling environment recognition device 60, falls below a proximity threshold. In other words, the proximity determination section 57 excludes those of the different vehicle Ao that will move away from the subject vehicle As.

Figure 22:
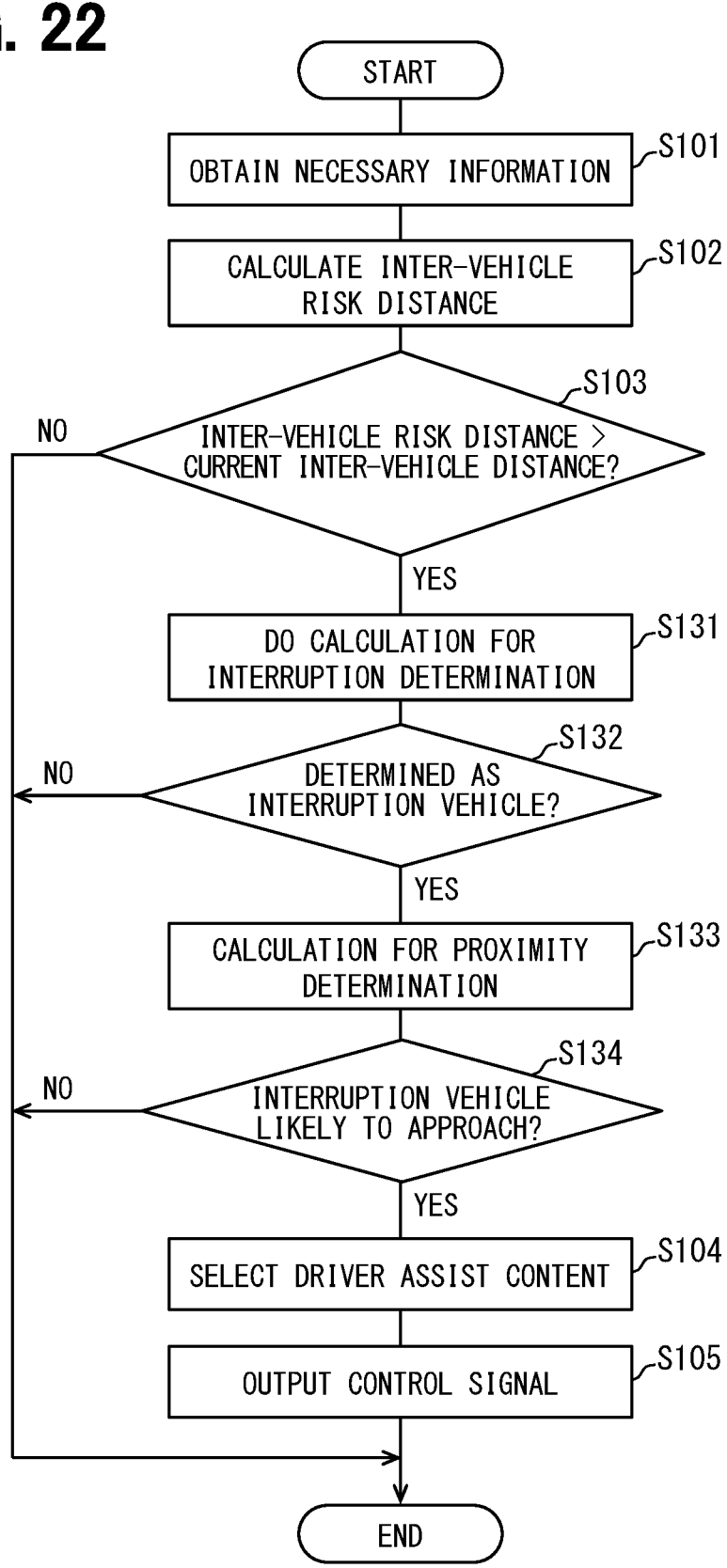
FIG. 22 is a flowchart showing the details of a driver assist process when merging determination and proximity determination are positive.

The selection section 54 cancels presentation of an alarm with respect to the different vehicle Ao moving away from the subject vehicle As based on the determination made by the proximity determination section 57. A driver assist process when merging determination as well as proximity determination are positive will be described below in detail based on FIG. 22 and with reference to FIG. 3. The process steps from S101 to S105, S131, and S132 are substantially the same as the driver assist process of FIG. 18.

At S133, calculations are performed for determination of whether the different vehicle Ao that has been determined as a merging vehicle Ai at S132 is approaching, and the process goes to S134. Alternatively, the TTC regarding the different vehicle Ao may simply be obtained from the traveling environment recognition device 60 in the process at S133.

At S134, the TTC obtained at S133 is compared with a predetermined proximity threshold. If the TTC is not less than the proximity threshold, the merging vehicle Ai is determined to be moving away from the subject vehicle As at S134, and the driver assist process is ended. If, for example, the traveling speed of the merging vehicle Ai is faster than that of the subject vehicle As, alerting can be canceled. If the TTC is less than the proximity threshold, the different vehicle Ao is determined to be approaching the subject vehicle As at S134. An alarm indicating the presence of a merging vehicle Ai is presented through the steps of S104 and S105.

Determination of proximity possibility will be described in detail.

Before carrying out the proximity determination process, the proximity determination section 57 shown in FIG. 2 determines whether it is possible that the different vehicle Ao may come closer to the subject vehicle As. Even if no different vehicle Ao is approaching the subject vehicle As, driver assistance such as presentation of an alarm is started based on the proximity possibility determination, if there is a possibility that the different vehicle may approach the subject vehicle As. One scene where the proximity determination section 57 determines that the different vehicle may come closer will be described below.

Figure 23:
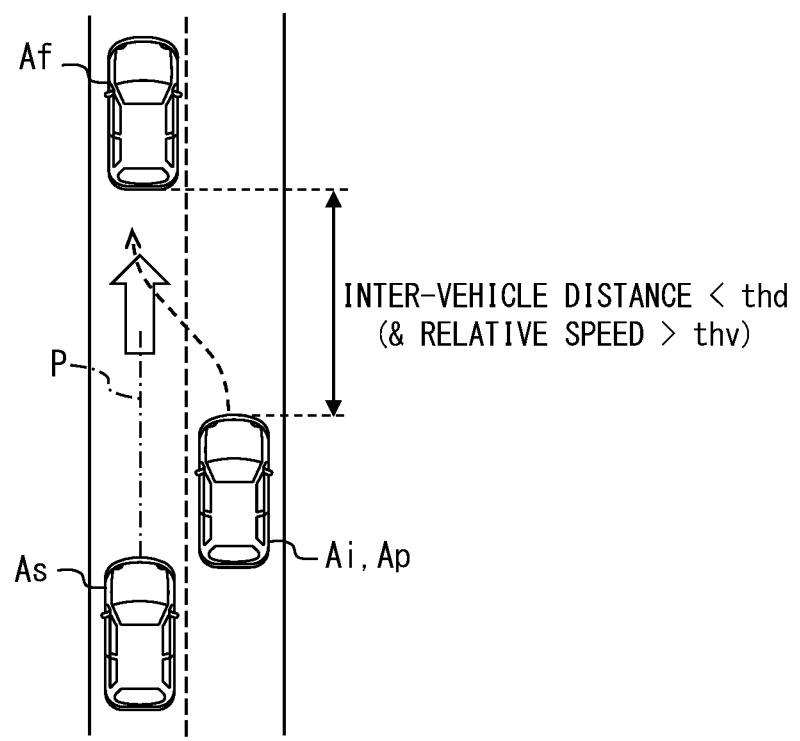
FIG. 23 is a diagram showing one example of a scene where it is determined that there is a possibility of proximity.

As shown in FIG. 23, when a merging vehicle Ai cuts in between the subject vehicle As and a preceding vehicle Af, it is likely that this merging vehicle Ai, hindered by the preceding vehicle Af, will come closer to the subject vehicle As. Therefore, the proximity determination section 57 determines the possibility of the side-by-side vehicle Ap coming closer to the subject vehicle As, based on the inter-vehicle distance between the preceding vehicle Af and the side-by-side vehicle Ap (corresponding to a merging vehicle Ai). More specifically, the proximity determination section 57 determines that there is a possibility that the side-by-side vehicle Ap in the adjacent lane may approach the subject vehicle As, based on a fact that the inter-vehicle distance falls below an inter-vehicle distance threshold thd.

The proximity determination section 57 may additionally use the relative speed of the side-by-side vehicle Ap with respect to the preceding vehicle Af for the determination of proximity possibility. More specifically, the proximity determination section 57 recognizes the side-by-side vehicle Ap as a merging vehicle Ai that may cut in, when, in addition to the fact that the inter-vehicle distance between the preceding vehicle Af and the side-by-side vehicle Ap has been reduced, the relative speed of the side-by-side vehicle Ap with respect to the preceding vehicle Af exceeds a speed threshold thv.

Figure 24:
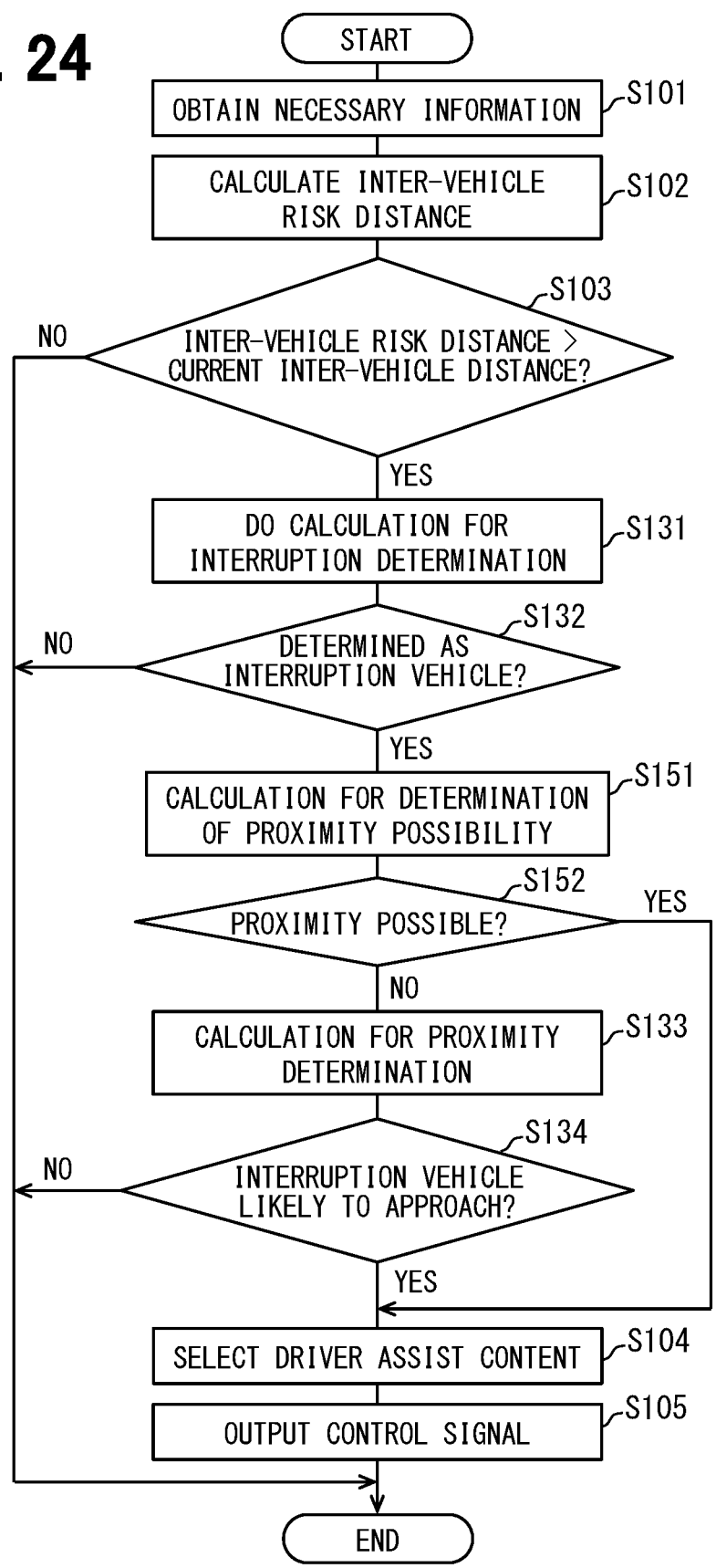
FIG. 24 is a flowchart showing the details of a driver assist process when determination of proximity possibility is positive in addition to merging determination and proximity determination.

The selection section 54 shown in FIG. 2 executes presentation of an alarm indicating the presence of a side-by-side vehicle Ap when the proximity determination section 57 has determined that there is a proximity possibility. A driver assist process when merging determination and proximity determination as well as proximity possibility determination are positive will be described below in detail based on FIG. 24 and with reference to FIG. 23. The process steps from S101 to S105 and from S131 to S134 are substantially the same as the driver assist process of FIG. 22.

At S151, calculations are performed for determination of proximity possibility with respect to the different vehicle Ao that has been determined as a merging vehicle Ai at S132, and the process goes to S152. At S152, it is determined whether there is a possibility of the merging vehicle Ai (corresponding to a side-by-side vehicle Ap) coming closer, based on the calculation results at S151. If it is not determined at S152 that there is a possibility of the merging vehicle Ai approaching, the process goes to S133 for proximity determination. If it is determined at S152 that there is a possibility of the merging vehicle Ai approaching, S133 and S134 are skipped and S104 and S105 are carried out. An alarm indicating the presence of a merging vehicle Ai, which has been assumed to possibly come closer, is presented through the steps above.

(Switching of Proximity Thresholds)

Figure 25A:
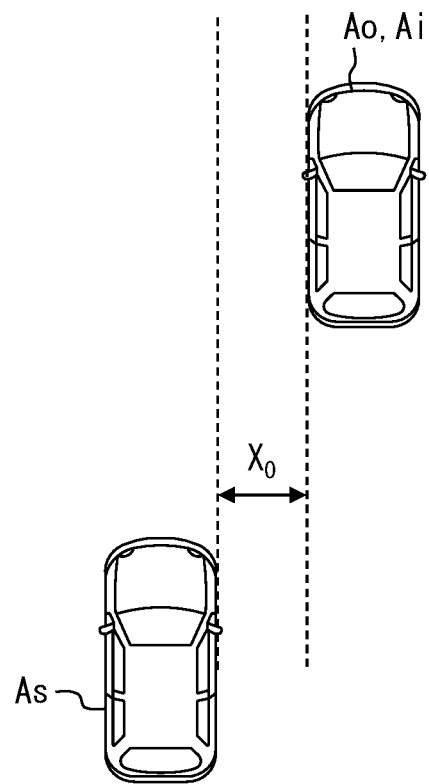
FIG. 25A is a diagram for explaining the difference between a preceding vehicle and a merging vehicle.
Figure 25B:
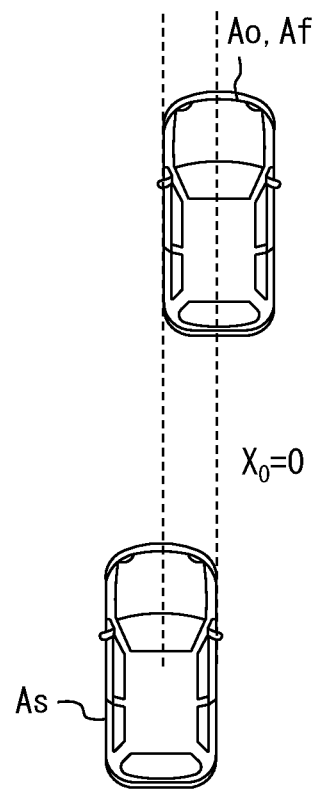
FIG. 25B is a diagram for explaining the difference between a preceding vehicle and a merging vehicle.

The proximity determination section 57 shown in FIG. 2 switches the proximity thresholds used for proximity determination based on the relative position of the different vehicle Ao with respect to the subject vehicle As, i.e., an amount of lateral displacement $x_0$ (see FIG. 25A and FIG. 25B) between the subject vehicle As and the different vehicle Ao. In the following description, the different vehicle Ao without any displacement $x_0$ (zero displacement), i.e., the different vehicle Ao overlapping the subject vehicle As in the lateral direction, shall be referred to as a preceding vehicle Af (see FIG. 25B). The different vehicle Ao having an amount of displacement $x_0$ on the right side or left side, i.e., a positive absolute value of displacement $x_0$, shall be a merging vehicle Ai (see FIG. 25A).

Figure 26:
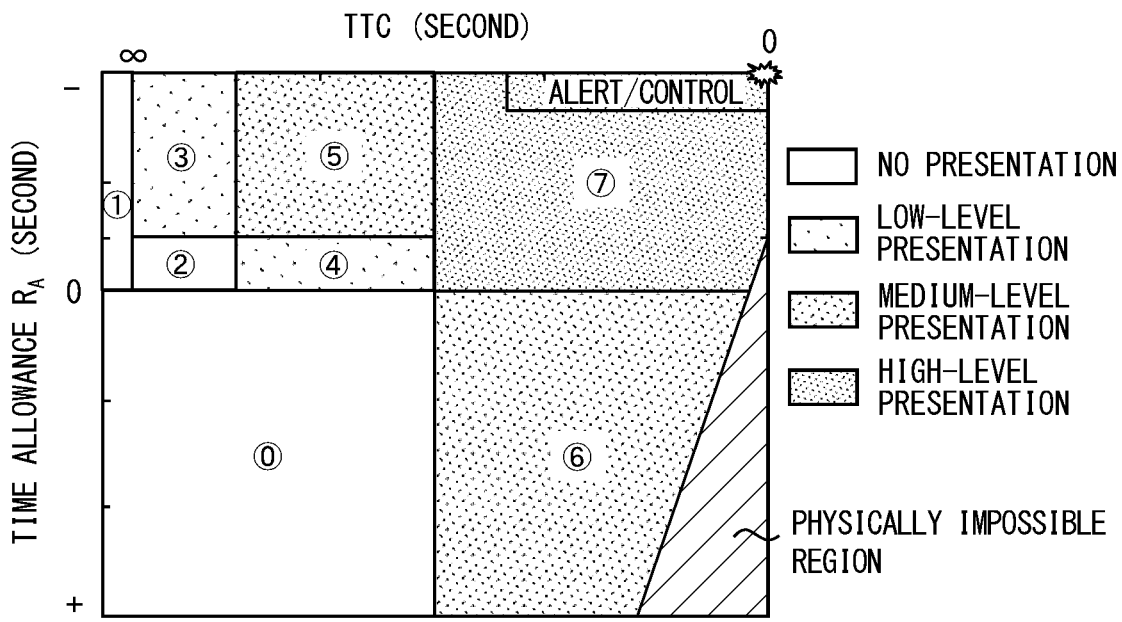
FIG. 26 is a table used when presenting an alarm with respect to a preceding vehicle, showing correspondence between time allowance and TTC, and the contents to be presented (alarm level)
Figure 27:
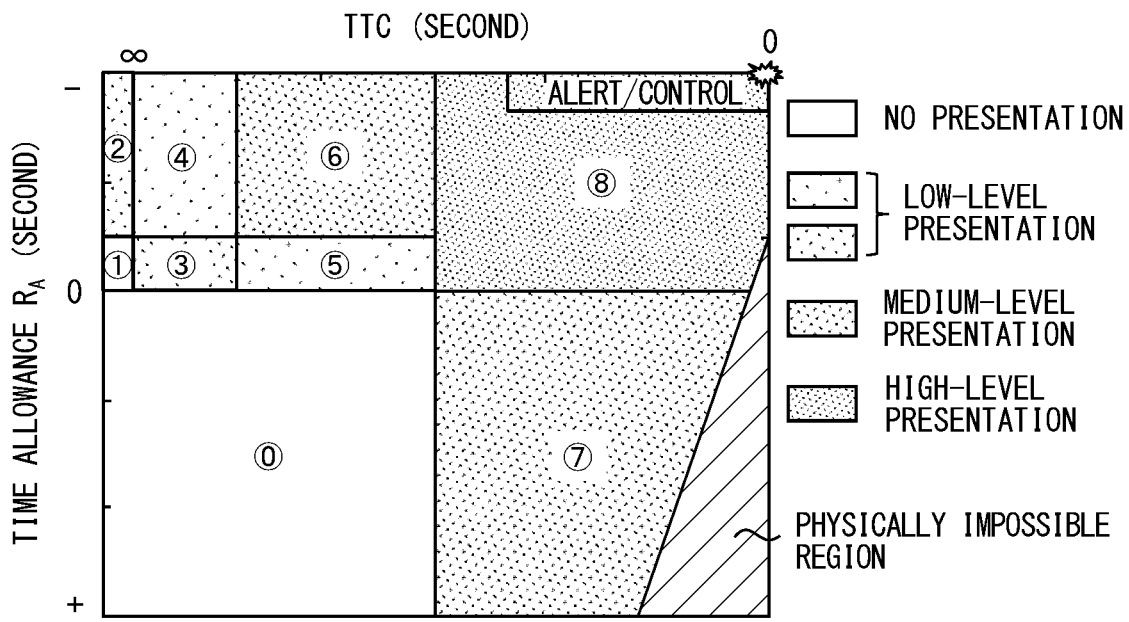
FIG. 27 is a table used when presenting an alarm with respect to a merging vehicle, showing correspondence between time allowance and TTC, and the contents to be presented (alarm level)

As shown in FIG. 26 and FIG. 27, when an alarm is to be presented as driver assistance, the risk estimation apparatus 50 determines the necessity of alarm presentation, and if it is to be presented, sets an alarm level, based on the time allowance $R_A$ and TTC. When the different vehicle Ao is a preceding vehicle Af, an alarm is presented based on the setting shown in the table of FIG. 26. When the different vehicle Ao is a merging vehicle Ai, an alarm is presented based on the setting shown in the table of FIG. 27.

As described above, the proximity determination section 57 determines that the different vehicle Ao is approaching based on the fact that TTC falls below the proximity threshold. The proximity threshold is set larger for a merging vehicle Ai than for a preceding vehicle Af. This way, proximity determination is made earlier for the merging vehicle Ai than for the preceding vehicle Af. Therefore, presentation of a low-level alarm indicating a merging vehicle Ai is started with a longer TTC than when starting presentation of an alarm indicating a preceding vehicle Af (see regions 2 and 3 in FIG. 27).

Figure 28:
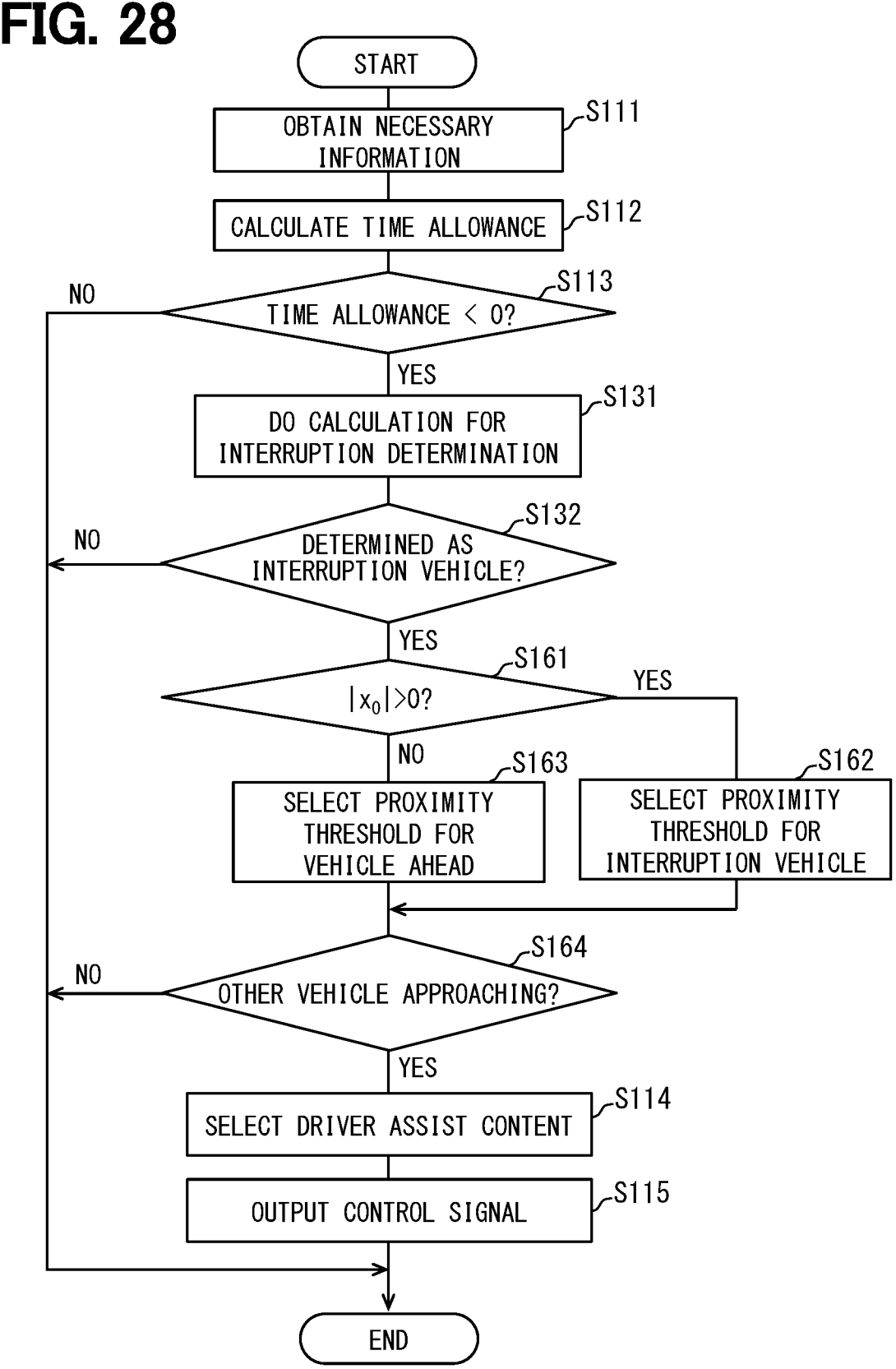
FIG. 28 is a diagram showing the details of a driver assist process when switching of proximity thresholds is effective.
Figure 29A:
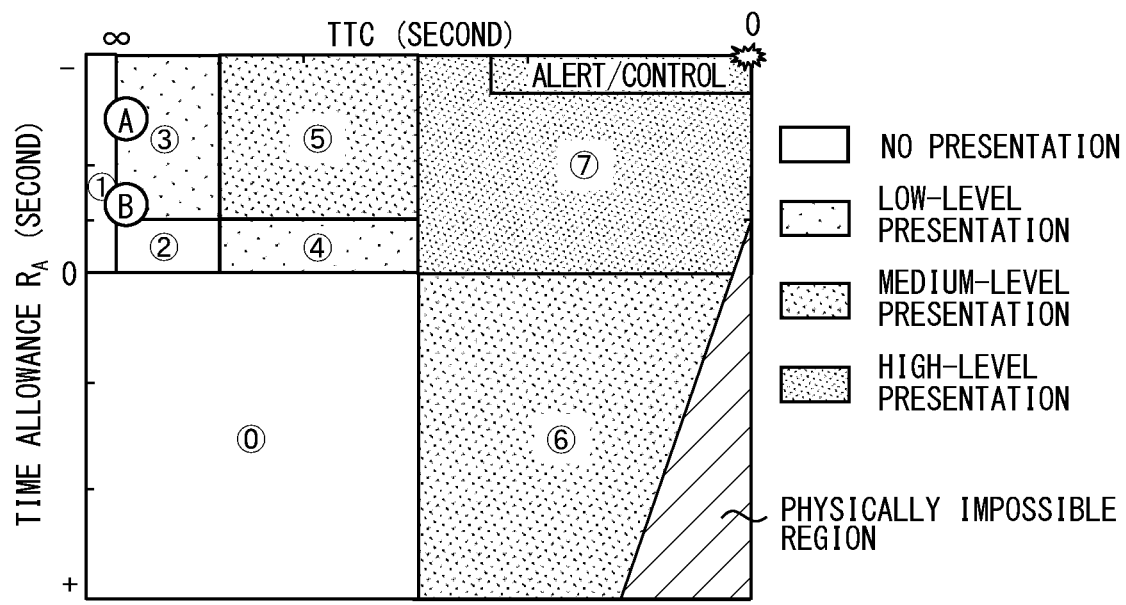
FIG. 29A is a diagram explaining how one of multiple different vehicles is prioritized in providing driver assistance.
Figure 29B:
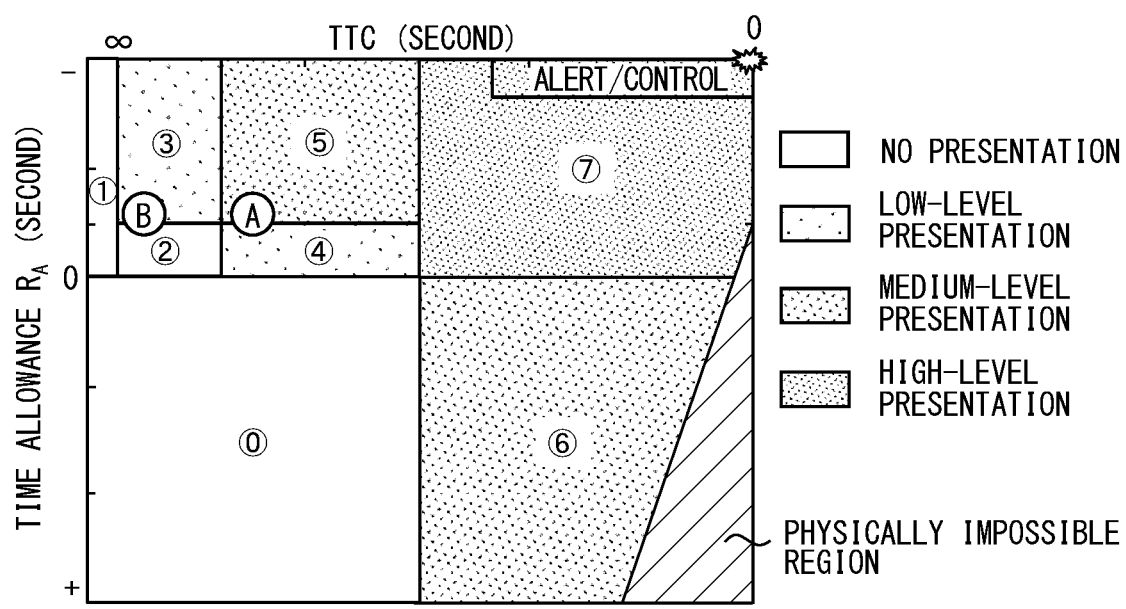
FIG. 29B is a diagram for explaining how one of multiple different vehicles is prioritized in providing driver assistance.
Figure 29C:
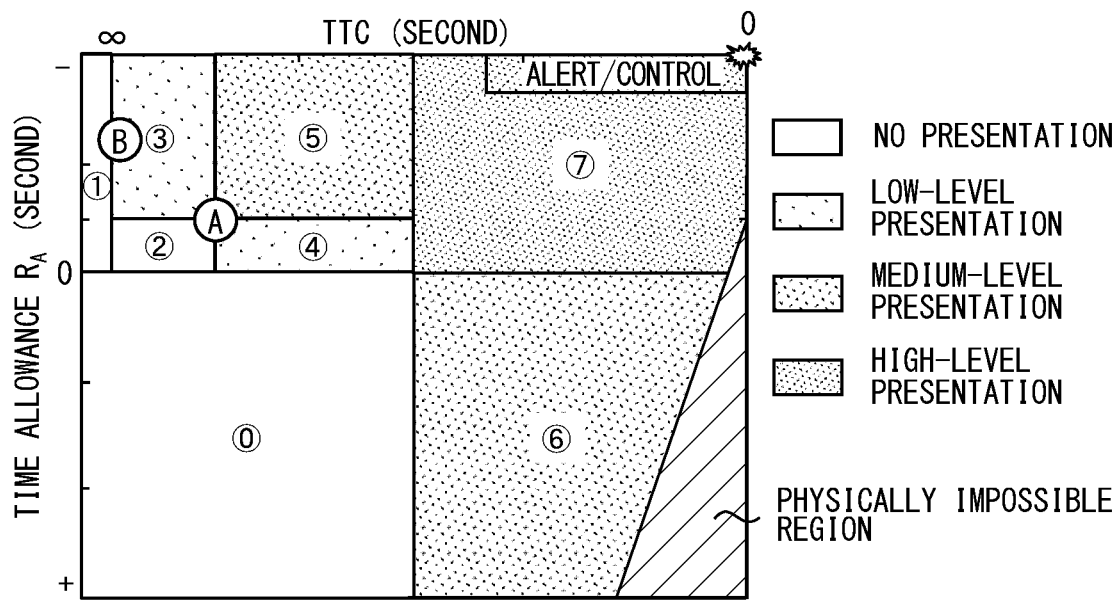
FIG. 29C is a diagram for explaining how one of multiple different vehicles is prioritized in providing driver assistance.
Figure 29D:
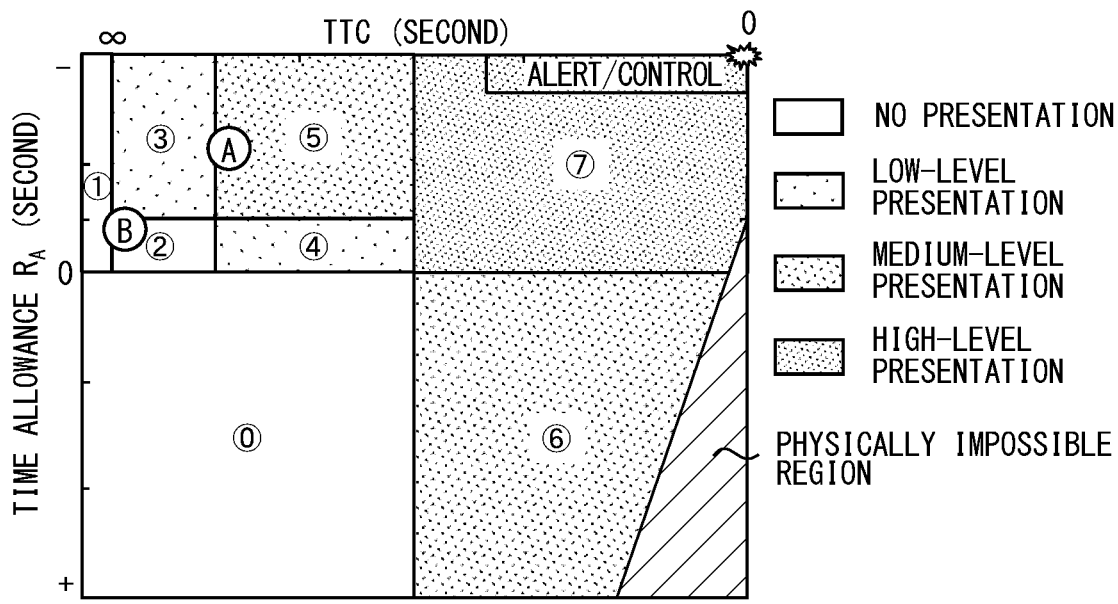
FIG. 29D is a diagram for explaining how one of multiple different vehicles is prioritized in providing driver assistance.

A driver assist process when the switching of the proximity thresholds is effective will be described below in detail based on FIG. 28 and with reference to FIG. 3. The process steps from S111 to S115 are substantially the same as the driver assist process of FIG. 11, and the process steps of S131 and S132 are substantially the same as the driver assist process of FIG. 18.

At S161, it is determined whether the absolute value of the amount of lateral displacement $x_0$ is positive, with respect to the different vehicle Ao that has been determined as a merging vehicle Ai at S132. If it is determined at S161 that there is a lateral displacement $x_0$, the process goes to S162. At S162, a proximity threshold, which is preset larger for the merging vehicle Ai, is set, and the process goes to S164. If it is determined at S161 that there is no lateral displacement $x_0$, the process goes to S163. At S163, a normal proximity threshold for a preceding vehicle Af is selected, and the process goes to S164.

As S164, it is determined whether the different vehicle Ao is approaching the subject vehicle As based on the proximity threshold set at S162 or S163. If it is determined at S164 that the different vehicle Ao is not approaching, S114 and S115 are skipped and driver assistance is canceled. If the different vehicle Ao is determined to be approaching at S164, an alarm indicating the presence of the different vehicle Ao is presented through the steps S114 and S115.

(Driver Assistance when Faced with Several Risks)

When the calculation section 53 has worked out multiple risk estimation values regarding the different vehicles Ao, the selection section 54 shown in FIG. 2 selects driver assist content corresponding to one of the different vehicles Ao having a shortest TTC. If there are multiple different vehicles Ao having substantially the same TTC, the selection section 54 selects driver assist content corresponding to one of the different vehicles Ao closest to the subject vehicle As. More specifically, the selection section 54 selects driver assist content for "A" in each of the scenes shown in FIG. 29A to FIG. 29D, where "A" and "B" are both the different vehicles Ao.

Figure 30:
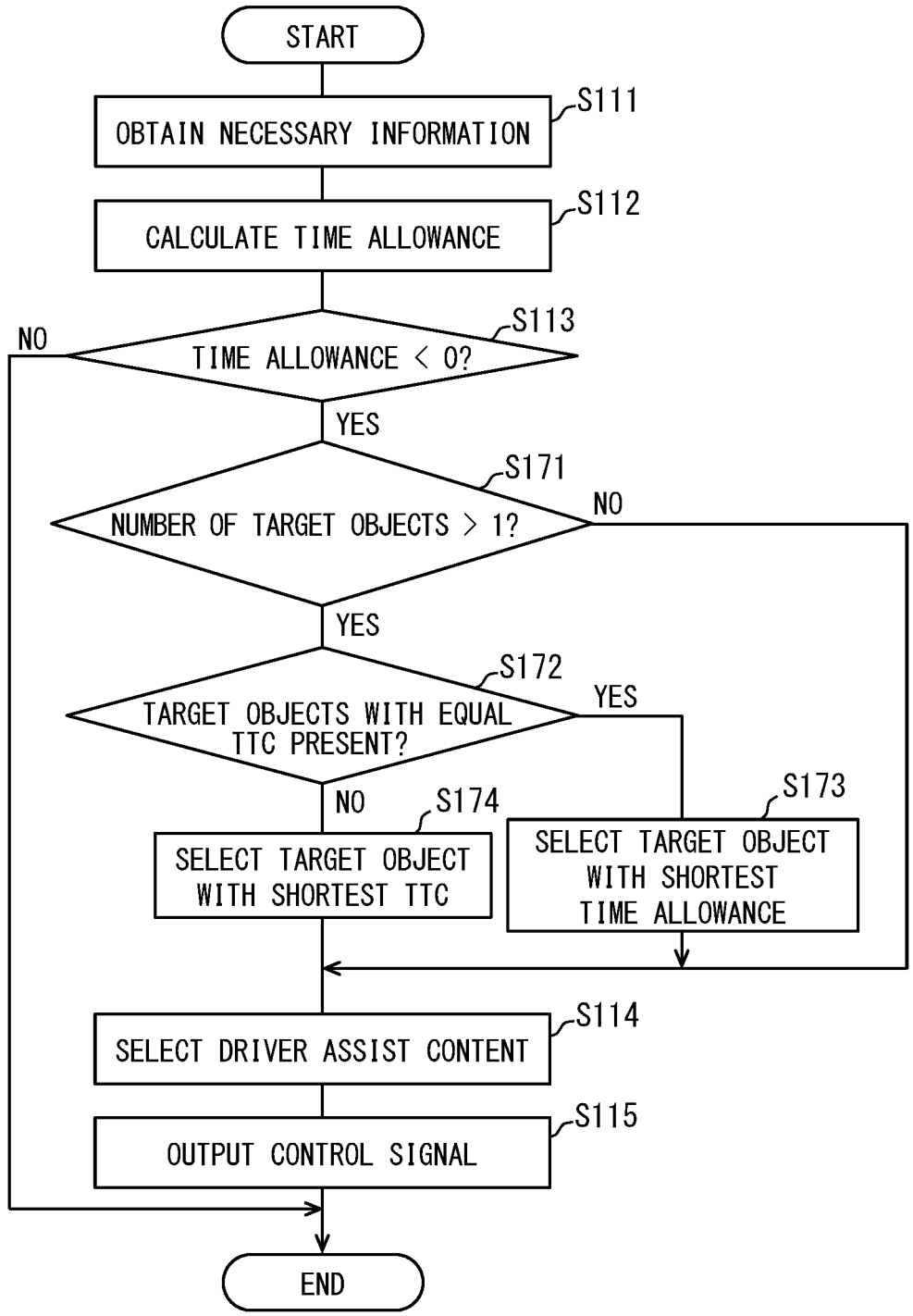
FIG. 30 is a diagram showing the details of a driver assist process when there are multiple different vehicles around the subject vehicle.
Figure 31:
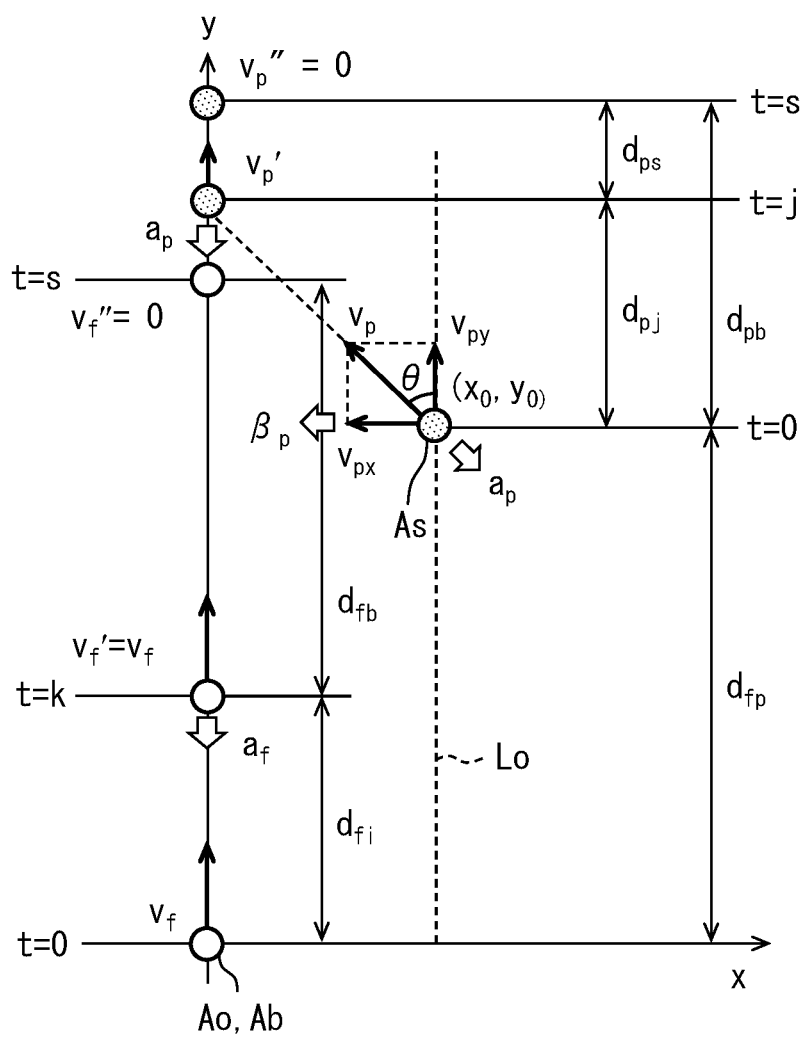
FIG. 31 is a diagram explaining the concept of mathematical expressions for calculating an inter-vehicle risk distance in a scene where the subject vehicle merges into an expected course of the different vehicle.
Figure 32:
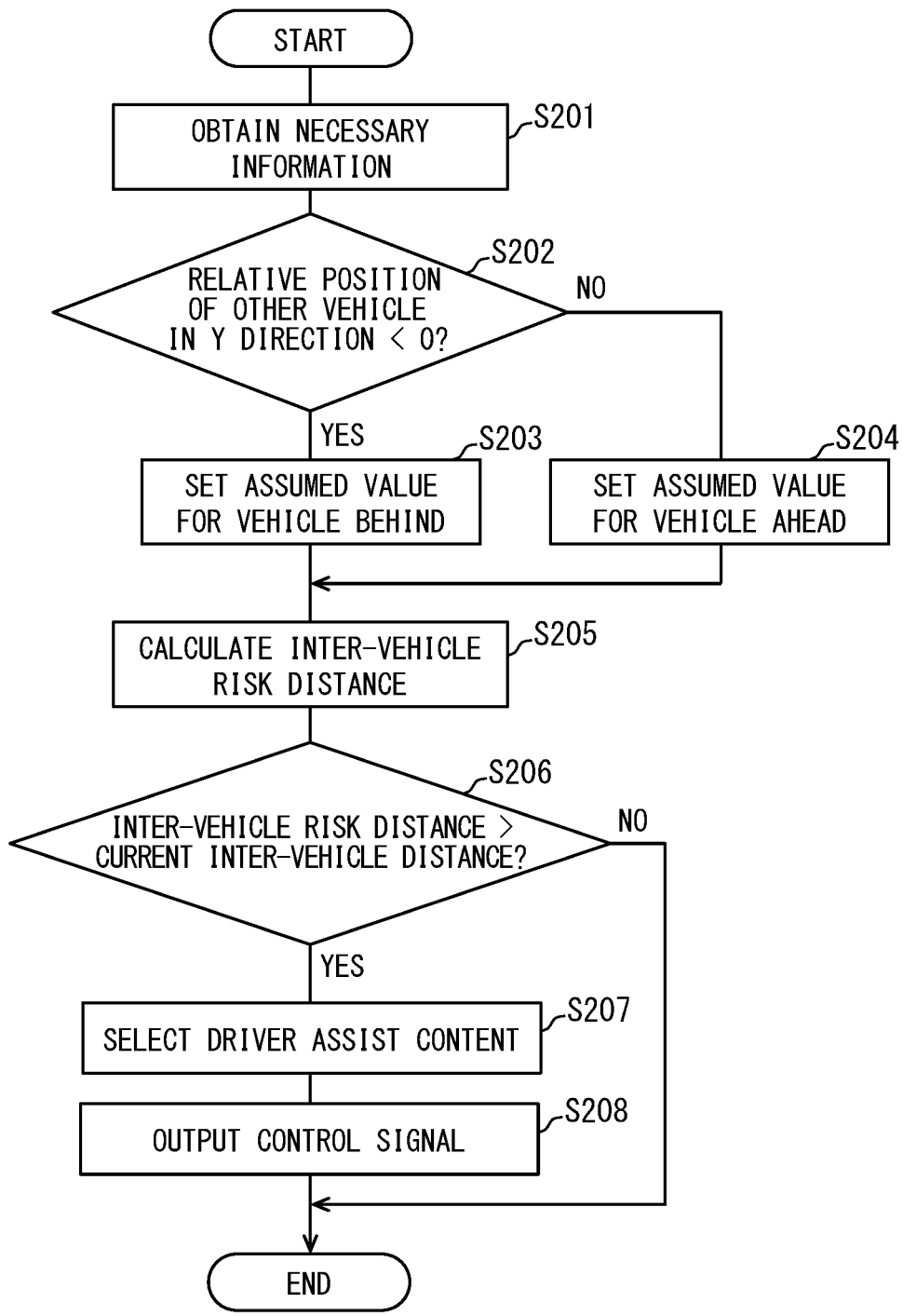
FIG. 32 is a flowchart showing the details of a driver assist process according to a second embodiment.

A driver assist process containing a process of selecting one of the multiple different vehicles Ao as the intended target will be described below in detail based on FIG. 30 and with reference to FIG. 3. The process steps from S111 to S115 are substantially the same as the driver assist process of FIG. 11.

At S171, it is determined whether the number of target objects is more than one, which is the number of the different vehicles Ao for which time allowance $R_A$ was calculated at S112 and the time allowance $R_A$ was determined to be a negative value at S113. If it is determined that there is only one different vehicle Ao having a negative value of time allowance $R_A$ at S171, an alarm indicating the presence of the different vehicle Ao is presented through the steps S114 and S115.

If it is determined at S171 that time allowance RA has been calculated for the multiple different vehicles Ao, the process goes to S172. At S172, TTCs of the different vehicles Ao are compared, to determine whether there are target objects having the same TTC. If it is determined at S172 that there are target objects having the same TTC, the process goes to S173. At S173, the target object having a smallest time allowance RA is selected as a risk object, and the process goes to S114. Alternatively, at S173, the target object having a maximum value of difference between the inter-vehicle risk distance D and the current inter-vehicle distance may be selected as the risk object. Either way, one of the different vehicles Ao that is closest to the subject vehicle As is selected as the intended target to be presented.

If it is determined at S172 that there are no target objects having the same TTC, the process goes to S174. At S174, the target object having a smallest TTC is selected as the risk object, and the process goes to S114. At S114, driver assist content corresponding to the target object (the different vehicle Ao) set at S173 or S174 is selected, and the process goes to S115. An alarm indicating the presence of the different vehicle Ao is presented through the step of S115.

In the first embodiment described so far, the risk estimation value is calculated based on the detected information related to a lateral position of the different vehicle Ao, on an assumption that the different vehicle Ao, even though it is not present on the expected course P of the subject vehicle As, will move into this expected course P of the subject vehicle As. Thus, even when the different vehicle Ao is driving off the expected course P of the subject vehicle, driver assist content corresponding to the risk estimation value can be selected. Therefore, even if the different vehicle Ao cuts into the expected course P of the subject vehicle As, driver assistance is performed smoothly in accordance with the risk imposed by the different vehicle Ao.

Moreover, in the first embodiment, the risk estimation value of the different vehicle Ao traveling on the expected course P, and the risk estimation value of the different vehicle Ao that is not present on the expected course P, are calculated using the same mathematical expressions, i.e., the mathematical expressions shown in Formula 1 and Formula 7. Thus the calculation section 53 can calculate risk estimation values continually without having to switch expressions for the calculation during the process in which the different vehicle Ao moves into the expected course P. As a result, the risk estimation value calculated with respect to the different vehicle Ao that may cut into the expected course P rises continuously. Accordingly, it is unlikely that driver assistance is provided suddenly. Moreover, using the same expressions for calculation can simplify the process of computing the risk estimation value. This way, the driver assist process can be performed while avoiding an increase in processing load on the processor 151.

In the first embodiment, acceleration or the like of the different vehicle Ao are set as assumed values, and actual measured values based on the detected information and the assumed values are both used for computing the risk estimation value. For example, it is considered the acceleration of the laterally moving the different vehicle Ao is unlikely to vary largely. Therefore, an assumed value that is probable can be set. Setting an adequately assumed value enables execution of driver assistance at the right timing.

In the first embodiment, at least one of inter-vehicle risk distance D and time allowance $R_A$ is calculated as the risk estimation value. In this way, the in-vehicle system 100 can execute driver assistance that prevents approach of the different vehicle Ao that exceeds a tolerable level of inter-vehicle risk distance D and time allowance $R_A$ at the right timing. With the assistance above, the driver can keep a low-risk positional relationship with the different vehicle Ao. The in-vehicle system 100 can start driver assistance substantially at the same timing, whether it uses the inter-vehicle risk distance or time allowance.

Moreover, in the first embodiment, execution of driver assistance with respect to the different vehicle Ao as a risk object is canceled when it is assumed that the different vehicle will not contact the subject vehicle As, based on the contact determination by the contact determination section 55. Holding back alerting of the different vehicle Ao that should not be regarded as a risk in this way can prevent occurrence of a situation where providing driver assistance could raise the risk.

Moreover, in the first embodiment, execution of driver assistance regarding the different vehicle Ao that is identified as a risk object but expected to not cut in is canceled, based on the merging determination made by the merging determination section 56. By making such selection, no alarms or the like are given even when the calculated risk estimation value suggests that the different vehicle Ao in an adjacent lane could be an object that requires driver assistance. This way, the driver assistance is provided such that objects that will likely alert the driver are specifically selected. Thus driver assistance the driver will hardly find annoying can be provided.

Moreover, in the first embodiment, it is determined whether there is a possibility of merging before determining whether the merging is happening. If the different vehicle Ao has a possibility of cutting in, driver assistance is performed in accordance with the risk estimation value, without the merging determination process. By carrying out the process of determining whether there is a possibility of merging before determining whether the merging is happening this way, it is possible to provide driver assistance that predicts a subsequent action of the different vehicle Ao.

More specifically, in the first embodiment, the merging determination section 56 determines that there is a possibility of merging when the inter-vehicle distance between a preceding vehicle Af and the following vehicle in an adjacent lane is reduced, or when it is expected from the road design that a side-by-side vehicle Ap will likely cut in. Such approach whereby the possibility of merging is determined allows the risk estimation apparatus 50 to accurately predict subsequent actions of the different vehicle Ao and to perform protective driver assistance in good time.

Furthermore, according to the first embodiment, no driver assistance is performed regarding a merging vehicle Ai that is identified as a risk object in a scene where the possible merging vehicle Ai will move away from the subject vehicle As, based on the proximity determination made by the proximity determination section 57. Picking out the different vehicle Ao moving away from the subject vehicle As this way can hold back driver assistance regarding the different vehicle Ao that should not be regarded as risk objects. As a result, driver assistance that the driver will hardly find annoying can be provided.

Moreover, in the first embodiment, it is determined whether there is a proximity possibility before proximity determination. If the different vehicle Ao is determined to have a proximity possibility, driver assistance is performed in accordance with the risk estimation value, without performing the proximity determination process. By carrying out the process of determining a proximity possibility before determining proximity this way, it is possible to provide driver assistance that predicts a subsequent action of the different vehicle Ao.

More specifically, in the first embodiment, the proximity determination section 57 determines that there is a possibility of proximity when a measured inter-vehicle distance between a preceding vehicle Af driving in the same lane as the subject vehicle As and a side-by-side vehicle Ap in an adjacent lane falls below a threshold. Such approach whereby the proximity possibility is determined allows the risk estimation apparatus 50 to recognize a merging vehicle Ai as a risk object, if the vehicle is expected to approach the subject vehicle As after the merging vehicle Ai has cut in, even though the merging vehicle Ai may temporarily move away from the subject vehicle As. Thus it is possible to accurately predict subsequent actions of the different vehicle Ao and to perform driver assistance in good time.

In the first embodiment, moreover, the timing for starting driver assistance regarding a merging vehicle Ai is different from the timing for starting driver assistance regarding a preceding vehicle Af. More specifically, alarm presentation regarding a merging vehicle Ai is performed earlier than that for a preceding vehicle Af having the same TTC. The driver regards a merging vehicle Ai as a higher risk than a preceding vehicle Af that is continuously in front. Therefore, with an adjustment to start alarm presentation regarding the merging vehicle Ai with a longer TTC, it is possible to provide driver assistance that conforms to how the driver feels about possible risks.

Moreover, according to the first embodiment, in a scene where the multiple different vehicles Ao are present around the subject vehicle As, the selection section 54 selects driver assist content intended for the different vehicle Ao having a shortest TTC. Furthermore, in a scene where the multiple different vehicles Ao have the same TTC, the selection section 54 selects driver assist content intended for the different vehicle Ao closest to the subject vehicle As. Such ranking based on TTC or proximity allows the risk estimation apparatus 50 to correctly select one of the different vehicles Ao that the driver regards as having a highest risk and to give priority to driver assistance regarding such vehicle. Thus, driver assistance that is assuring and congenial to the driver's sense of risk can be provided. In the first embodiment, the risk estimation apparatus 50 corresponds to the driver assist apparatus.

Second Embodiment

A second embodiment of the present disclosure shown in FIG. 31 to FIG. 34 is a variation example of the present disclosure. The risk estimation apparatus 50 of the second embodiment additionally calculates a risk estimation value with regard to a behind vehicle Ab. Specifically, in a scene where the subject vehicle As travels off the expected course P of the different vehicle Ao, the calculation section 53 calculates the risk estimation value of the behind vehicle Ab with respect to the subject vehicle As, on an assumption that the subject vehicle As will move into the expected course P of the behind vehicle Ab that is the different vehicle Ao.

The calculation section 53 uses the detected information related to a lateral position of the behind vehicle Ab with respect to the subject vehicle As for the calculation of the risk estimation value. In the scene where the subject vehicle As cuts into the expected course P of the different vehicle, the calculation section 53 calculates the inter-vehicle risk distance D or time allowance $R_A$ with respect to the behind vehicle Ab based on the mathematical expressions shown in Formula 1 and Formula 7. The parameters for the subject vehicle As and the different vehicle Ao plugged into the items of the expressions are swapped, when calculating the inter-vehicle risk distance D and time allowance $R_A$ with respect to the behind vehicle Ab.

More specifically, in the mathematical expressions shown in Formula 1 and Formula 7, $v_f$ represents the traveling speed of the behind vehicle Ab, $v_p$ represents the traveling speed of the different vehicle Ao, $a_p$ represents the acceleration generated in the subject vehicle As, and $a_f$ represents the acceleration generated in the behind vehicle Ab. Further, $d_{fp}$ represents the inter-vehicle distance between the subject vehicle As and the behind vehicle Ab, $d_{pb}$ represents the braking distance of the subject vehicle, $d_f$ and $d_{fb}$ represent the non-braking distance and braking distance of the behind vehicle Ab, and k represents the non-braking time of the different vehicle's driver.

The relative positions $x_0$ and $y_0$, and the traveling speeds $v_{py}$ and $v_f$ of the different vehicle Ao are actual measured values similarly to the first embodiment. On the other hand, accelerations $a_f$, $a_p$, $\beta_p$, and k are assumed values. The specific assumed values differ from those of the first embodiment. The assumed values applied to the behind vehicle Ab are each adjusted, as compared to the assumed values applied to a preceding vehicle, such that the start of alarm presentation is delayed, or the alarm intensity is lowered. The non-braking time k that is associated with the driver status of the different vehicle Ao may be a constant value. Alternatively, if the status information of the different vehicle Ao is available through the use of vehicle-to-vehicle communication, the non-braking time k can be set based on the acquired status information.

The selection section 54 selects driver assist content corresponding to the risk estimation value of the different vehicle Ao calculated by the calculation section 53. A basic driver assist process of the second embodiment will be described below in detail based on FIG. 32 and with reference to FIG. 33.

At S201, information necessary for the risk estimation is acquired, and the process goes to S202. At S202, the relative position in the front-to-back (y) direction of the different vehicle Ao is determined based on the information acquired at S201. At S202, if the value indicative of the relative position in the y direction of the different vehicle Ao is determined as negative, the different vehicle Ao is recognized as a behind vehicle Ab, and the process goes to S203. At S203, an assumed value is set for the behind vehicle Ab, and the process goes to S205.

If the value indicative of the relative position in the y direction of the different vehicle Ao is determined to be not less than 0 at S202, the different vehicle Ao is recognized as a preceding vehicle, and the process goes to S204. At S204, an assumed value is set for the preceding vehicle, and the process goes to S205. Specific assumed values set at S204 may be substantially the same as the assumed values in the first embodiment. At S205, the inter-vehicle risk distance D is calculated based on the actual measured values obtained at S201 and assumed values set at S203 or S204, and the process goes to S206.

At S206, the current inter-vehicle distance obtained at S201 and the inter-vehicle risk distance D calculated at S205 are compared. If the current inter-vehicle distance is longer than the inter-vehicle risk distance D, it is determined that no driver assistance is necessary, and the driver assist process is ended. On the other hand, if it is determined that the current inter-vehicle distance is shorter than the inter-vehicle risk distance D, it is determined that driver assistance is needed, and the process goes from S206 to S207. An alarm indicating the presence of the different vehicle Ao is presented through the steps of S207 and S208.

Figure 33:
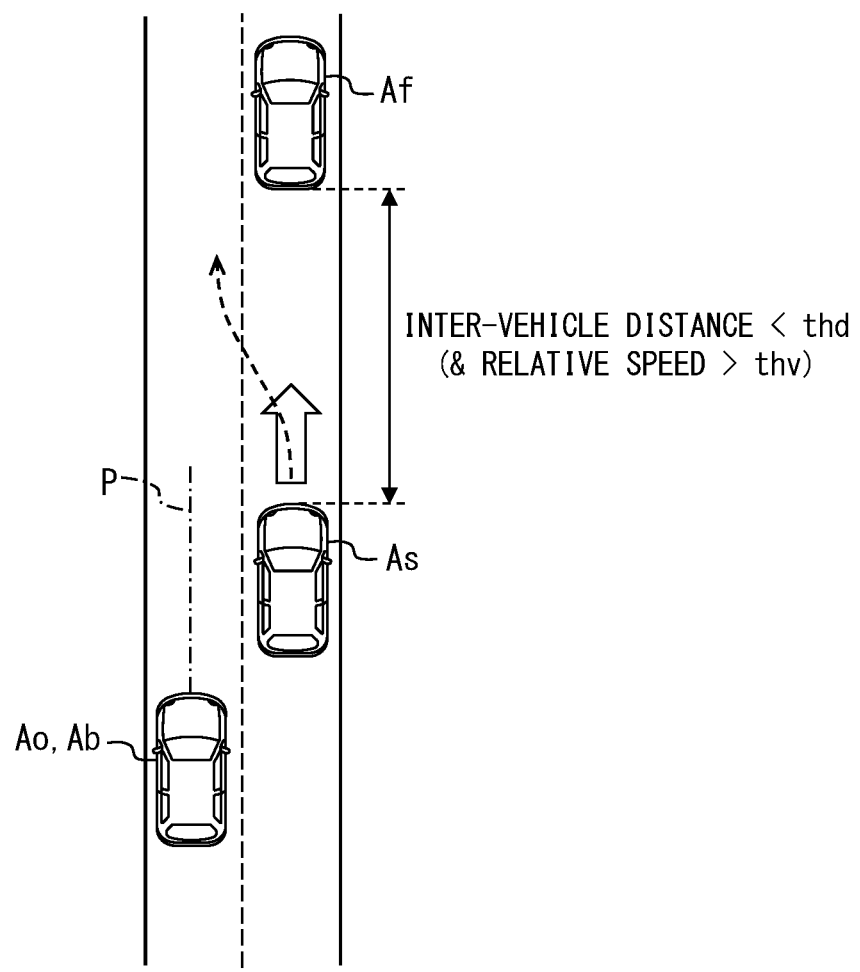
Figure 34:
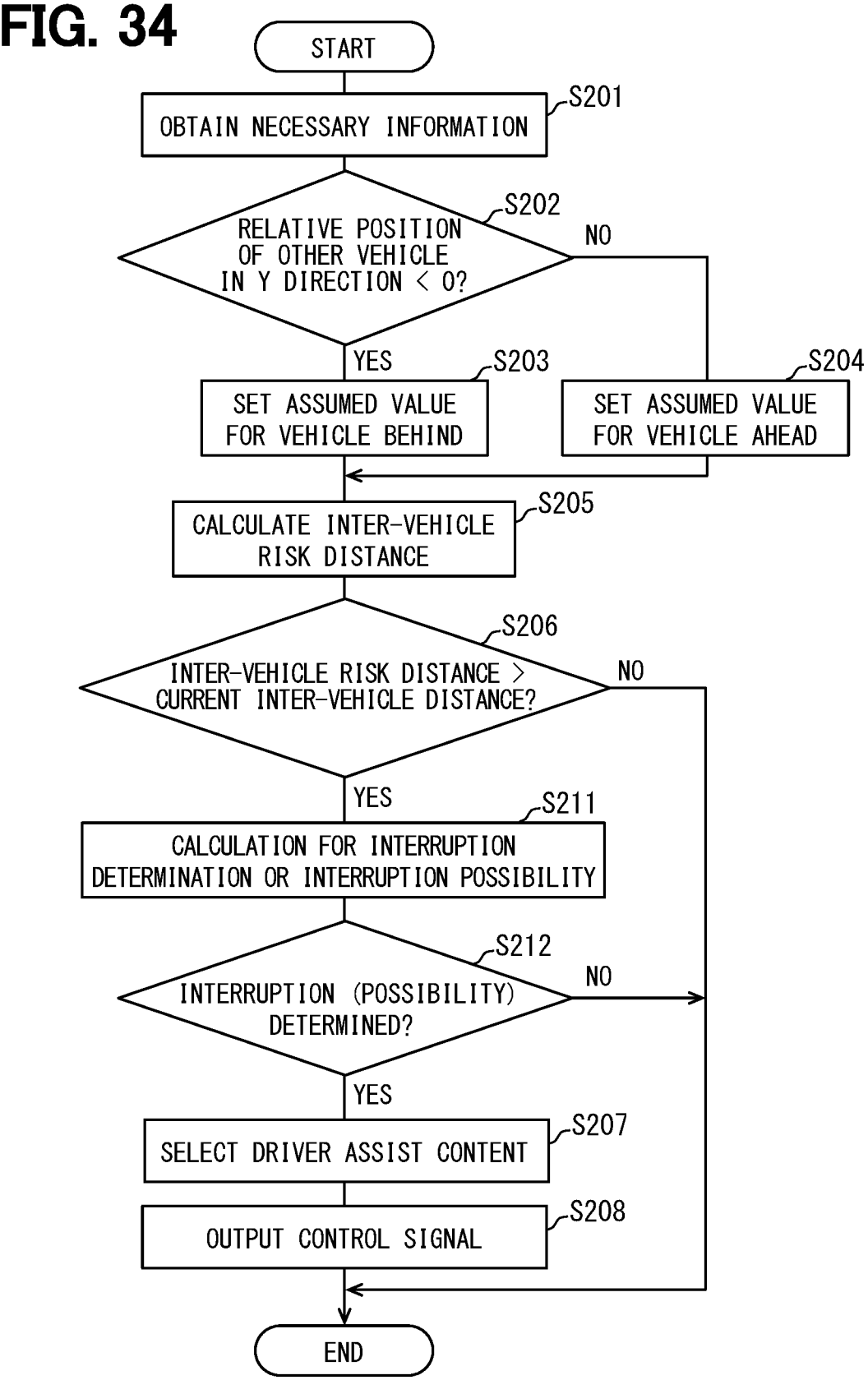
FIG. 34 is a flowchart showing the details of a driver assist process when merging determination or merging possibility determination is positive.

Next, in the second embodiment, a driver assist process when merging determination or merging possibility determination is positive will be described below in detail based on FIG. 33 and FIG. 34.

At S211, calculations are performed for merging determination or merging possibility with respect to the subject vehicle As or the different vehicle Ao (a preceding vehicle), and the process goes to S212. Merging determination regarding the subject vehicle As is possible based on whether the lateral speed of the subject vehicle As has exceeded a merging threshold thi, or whether the subject vehicle has crossed over lane markings, or whether the direction indicator has started blinking, and so on (see FIG. 15 to FIG. 17), similarly to the merging determination regarding the different vehicle Ao.

At S212, it is determined whether driver assistance is necessary based on the determination result at S211. If it is determined that neither the subject vehicle As nor the different vehicle Ao will cut in, or that there is no possibility of neither the subject vehicle As nor the different vehicle Ao cutting in, the driver assist process is ended. If it is determined that merging is happening or there is a possibility of merging, an alarm indicating the presence of the different vehicle Ao is presented through the steps S207 and S208.

In the second embodiment, even in a scene where the subject vehicle As will move into an expected course P of the behind vehicle Ab, the risk estimation value is calculated based on the detected information related to a lateral position of the behind vehicle Ab, on an assumption that the subject vehicle will move into the expected course P of the behind vehicle Ab. Thus, even when the subject vehicle As is driving off the expected course P of the behind vehicle Ab, driver assist content corresponding to the risk estimation value can be selected. Therefore, even if the subject vehicle As cuts into the expected course P of the behind vehicle Ab, driver assistance is performed smoothly in accordance with the risk imposed by the behind vehicle Ab.

Moreover, according to the second embodiment, the assumed values used for calculating the risk estimation value when the subject vehicle As cuts in front of the behind vehicle Ab are changed from those when the preceding vehicle cuts in front of the subject vehicle As. The alarm presentation when the subject vehicle As cuts in front of the behind vehicle Ab can be adjusted to be delayed or weaker as compared to the alarm presentation when the different vehicle cuts in front of the subject vehicle As. With the adjustment above, the alarm presentation as driver assistance can be made conformable to the sense of risk the driver will feel toward the different vehicle Ao.

OTHER EMBODIMENTS

While some embodiments of the present disclosure have been described above, the present disclosure should not be interpreted to be limited to these embodiments, and can be applied to various other embodiments and combinations thereof without departing from the scope of the subject matter of the present disclosure.

Figure 35:
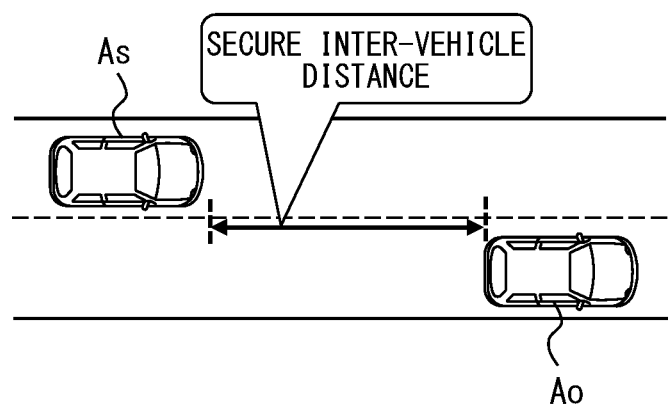
FIG. 35 is a diagram showing the driver assist content selected when ACC is operating.

In the embodiments described above, instances where an alarm is presented for alerting the driver to the different vehicles have been described as one example of driver assistance during manual driving. Specific contents of driver assistance can be changed as suited. For example, when the vehicle is driving at constant speed by the ACC feature, a speed control feature may be selected as driver assistance for securing an inter-vehicle distance between a preceding vehicle and the subject vehicle as shown in FIG. 35 before the preceding vehicle (the different vehicle Ao) driving in the adjacent lane cuts in. In the embodiments described above, the risk estimation apparatus 50 and the vehicle controller 80 function in coordination with each other as the driver assist apparatus.

The contact determination, merging determination, merging possibility determination, proximity determination, and proximity possibility determination described in the first embodiment are also applicable to the second embodiment. Each determination in various driver assist processes of the first embodiment can be made effectively with respect to a behind vehicle Ab by swapping parameters of the subject vehicle As and the behind vehicle Ab. The expressions for calculating the risk estimation value of a merging vehicle that is not present on the expected course of the subject vehicle may be different from the expressions for calculating the risk estimation value of a preceding vehicle on the expected course of the subject vehicle.

The functions of the driver assist apparatus may be realized by other configurations than the risk estimation apparatus 50 of the embodiments described above. For example, the selection section may be provided in the HMI controller 70. In this configuration, the information such as the inter-vehicle risk distance D, time allowance $R_A$, TTC, and so on is output from the risk estimation apparatus 50 to the HMI controller 70. The HMI controller 70 selects driver assist content based on the information acquired from the risk estimation apparatus 50 and controls the various information presentation devices. In the configuration described above, the risk estimation apparatus 50 and the HMI controller 70 function in coordination with each other as the driver assist apparatus. Alternatively, an integrated electronic control unit having both functions of the risk estimation apparatus 50 and the HMI controller 70 may be provided as a configuration corresponding to the driver assist apparatus.

The processors of various electronic control units provided to the in-vehicle system may be configured to execute the driver assist program according to the present disclosure to realize the driver assist method described above. Various non-transitory tangible storage media such as a flash memory, hard disk, and so on, can be employed for the memory of each electronic control unit as a storage configuration of the driver assist program.

It is noted that a flowchart or the processing of the flowchart in the present application includes multiple steps (also referred to as sections), each of which is represented, for instance, as S101. Further, each step can be divided into several sub-steps while several steps can be combined into a single step.

In the above, the embodiment, the configuration, an aspect of a driver assist apparatus and driver assist program according to the present disclosure are exemplified. However, the present disclosure is not limited to every embodiment, every configuration and every aspect related to the present disclosure are exemplified. For example, the field of the embodiment, the configuration, the aspect relate to the present disclosure includes the embodiment, the configuration, the aspect obtained by accordingly combining each technical part disclosed in different embodiment, configuration and aspect.

What is claimed is:

1. A driver assist apparatus comprising:
a processor including a memory configured to:
obtain a detected information of a different vehicle driving around a subject vehicle;
calculate a risk estimation value representing a level of risk imposed on the subject vehicle by the different vehicle, using the detected information related to a lateral relative position of the different vehicle with respect to the subject vehicle, on an assumption that the different vehicle which is off an expected course of the subject vehicle moves into the expected course;
select driver assist content corresponding to the risk estimation value calculated by the processor; and
determine whether the different vehicle cuts into the expected course,
wherein:
the driver assist apparatus assists a driver on the subject vehicle with driving tasks;
driver assist corresponding to the different vehicle cutting into the expected course is performed earlier than driver assist corresponding to a preceding vehicle driving on a lane on which the subject vehicle drives;
an inter-vehicle risk distance is a distance that allows the subject vehicle to stop without contacting the different vehicle that has moved into the expected course;
the processor calculates the inter-vehicle risk distance as the risk estimation value; and
the processor calculates the inter-vehicle risk distance from a mathematical expression as defined in $$D = v_f \cdot k - \frac{v_f^2}{2a_f} + \frac{v_p'^2}{2a_p} - \frac{v_p'^2 - v_p^2}{2a_p} \cos\theta$$

where D is the inter-vehicle risk distance, k is an expected non-braking time of the driver, $v_f$ is a traveling speed of the subject vehicle, $v_p$ is a traveling speed of the different vehicle moving into the expected course, $v_p'$ is a traveling speed of the different vehicle after having moved into the expected course, $a_f$ is an acceleration of the subject vehicle, $a_p$ is an acceleration of the different vehicle, and θ is an angle by a speed vector of the different vehicle and a speed vector of the subject vehicle.

2. The driver assist apparatus according to claim 1, wherein:
the processer calculates (i) the risk estimation value corresponding to the different vehicle driving on the expected course from a mathematical expression, and (ii) the risk estimation value corresponding to the different vehicle that is off the expected course from the identical mathematical expression.

3. The driver assist apparatus according to claim 1, wherein:
the processor obtains a relative position in a front-to-back direction of the different vehicle and a traveling speed of the different vehicle, the detected information being the lateral relative position of the different vehicle, the relative position in the front-to-back direction of the different vehicle, and the traveling speed;
the processor sets an assumed value of acceleration of the different vehicle moving into the expected course; and
the processor calculates the risk estimation value using both the detected information and the assumed value.

4. The driver assist apparatus according to claim 1, wherein:
a time allowance is a time period that allows the subject vehicle to stop without contacting the different vehicle that has moved into the expected course; and
the processor calculates the time allowance as the risk estimation value.

5. The driver assist apparatus according to claim 4, wherein:
the processor calculates the time allowance from a mathematical expression as defined in $$R_A = \frac{y_0}{v_f} - \left\{ k - \frac{v_f}{2a_f} + \frac{v_p'^2}{2v_f a_p} - \frac{v_p'^2 - v_p^2}{2v_f a_p} \cos\theta \right\}$$

where $R_A$ is the time allowance, k is the expected non-braking time of the driver, $v_f$ is the traveling speed of the subject vehicle, $v_p$ is the traveling speed of the different vehicle moving into the expected course, $v_p'$ is the traveling speed of the different vehicle after having moved into the expected course, $a_f$ is the acceleration of the subject vehicle, $a_p$ is the acceleration of the different vehicle, $y_0$ is an amount of displacement in a front-to-back direction of the different vehicle relative to the subject vehicle, and θ is the angle by the speed vector of the different vehicle and the speed vector of the subject vehicle.

6. The driver assist apparatus according to claim 1, wherein
the processor is configured to determine whether the different vehicle contacts the subject vehicle,
the processor cancels execution of driver assistance in response to determining that the different vehicle is unlikely to contact the subject vehicle.

7. The driver assist apparatus according to claim 1, wherein:
the processor cancels execution of driver assistance in response to determining in a merging determination that the different vehicle is unlikely to cut in the expected course.

8. The driver assist apparatus according to claim 7, wherein:
the processor determines before carrying out the merging determination whether a current situation is a scene where there is a possibility of the different vehicle cutting in front of the subject vehicle; and
the processor selects driver assist content corresponding to the risk estimation value of the different vehicle in response to determining that there is a possibility of the different vehicle cutting in front of the subject vehicle.

9. The driver assist apparatus according to claim 1, wherein
the processor is configured to determine proximity of the different vehicle to the subject vehicle,
the processor cancels execution of driver assistance in response to determining that the different vehicle does not approach the subject vehicle, even when the risk estimation value of the different vehicle is a value corresponding to a target of driver assistance.

10. The driver assist apparatus according to claim 9, wherein:
the processor determines whether a current situation is a scene where there is a possibility of the different vehicle approaching the subject vehicle, and
the processor selects driver assist content corresponding to the risk estimation value of the different vehicle in response to that there is a possibility of the different vehicle approaching the subject vehicle, even when the different vehicle is moving away from the subject vehicle.

11. The driver assist apparatus according to claim 9, wherein:
a merging vehicle is defined as the different vehicle moving laterally toward the expected course of the subject vehicle;
the processor determines that the different vehicle is approaching the subject vehicle based on a proximity threshold; and
the proximity threshold applied to the merging vehicle is set larger than the proximity threshold applied to the preceding vehicle.

12. The driver assist apparatus according to claim 1, wherein:
in a case where a plurality of the risk estimation values of the different vehicles are calculated by the processor,
the processor selects driver assist content corresponding to one of the different vehicles having a smallest value obtained by dividing an inter-vehicle distance to the subject vehicle by a relative speed.

13. The driver assist apparatus according to claim 12, wherein:
in a case where the different vehicles having the calculated division values similar to each other exist,
the processor selects driver assist content corresponding to one of the different vehicles closest to the subject vehicle.

14. The driver assist apparatus according to claim 1, wherein:
the processor calculates a risk of the different vehicle that is off the expected course lower than a risk of the preceding vehicle.

15. The driver assist apparatus according to claim 1, wherein:
the processor is configured to determine proximity of the different vehicle to the subject vehicle;
a merging vehicle is defined as the different vehicle moving laterally toward the expected course of the subject vehicle;
the processor determines an absolute value of amount of lateral displacement of the merging vehicle with respect to the subject vehicle;
in response to that it is determined that the absolute value of the amount of lateral displacement is more than zero, a first proximity threshold is set; and in response to that it is determined that the absolute value of the amount of lateral displacement is zero, a second proximity threshold different from the first proximity threshold is set.

16. A driver assist apparatus comprising:
a processor including a memory configured to:
obtain detected information of a different vehicle driving around a subject vehicle;
calculate a risk estimation value representing a level of risk imposed on the subject vehicle by the different vehicle, using the detected information related to a lateral relative position of the different vehicle with respect to the subject vehicle, on an assumption that the different vehicle drives on an expected course and that the subject vehicle driving off the expected course of the different vehicle moves into the expected course of the different vehicle;
select driver assist content corresponding to the risk estimation value calculated by the processor; or
determine whether the subject vehicle cuts into the expected course of the different vehicle, and the different vehicle cuts into the expected course of the subject vehicle,
wherein:
the driver assist apparatus assists a driver on the subject vehicle with driving tasks;
driver assist for a case where the subject vehicle cuts into the expected course of the different vehicle is performed slower or weaker than driver assist for a case where the different vehicle cuts into the expected course of the subject vehicle;
an inter-vehicle risk distance is a distance that allows the subject vehicle to stop without contacting the different vehicle that has moved into the expected course;
the processor calculates the inter-vehicle risk distance as the risk estimation value; and
the processor calculates the inter-vehicle risk distance from a mathematical expression as defined in $$D = v_f \cdot k - \frac{v_f^2}{2a_f} + \frac{v_p'^2}{2a_p} - \frac{v_p'^2 - v_p^2}{2a_p} \cos\theta$$

where D is the inter-vehicle risk distance, k is an expected non-braking time of the driver, $v_f$ is a traveling speed of the subject vehicle, $v_p$ is a traveling speed of the different vehicle moving into the expected course, $v_p'$ is a traveling speed of the different vehicle after having moved into the expected course, $a_f$ is an acceleration of the subject vehicle, $a_p$ is an acceleration of the different vehicle, and θ is an angle by a speed vector of the different vehicle and a speed vector of the subject vehicle.

17. A computer-readable non-transitory tangible storage medium storing a driver assist program, the driver assist program assisting a driver on a subject vehicle with driving tasks, the program causing a processor to execute:
acquiring detected information of a different vehicle driving around the subject vehicle;
calculating a risk estimation value representing a level of risk imposed on the subject vehicle by the different vehicle, using the detected information related to a lateral relative position of the different vehicle with respect to the subject vehicle, on an assumption that the different vehicle that is off an expected course of the subject vehicle moves into the expected course;
determining whether the different vehicle cuts into the expected course; and
selecting driver assist content corresponding to the calculated risk estimation value,
wherein:
driver assist corresponding to the different vehicle cutting into the expected course of the subject vehicle is performed earlier than driver assist corresponding to a preceding vehicle driving on a lane on which the subject vehicle drives;
an inter-vehicle risk distance is a distance that allows the subject vehicle to stop without contacting the different vehicle that has moved into the expected course;
the inter-vehicle risk distance is calculated as the risk estimation value; and
the inter-vehicle risk distance is calculated from a mathematical expression as defined in $$D = v_f \cdot k - \frac{v_f^2}{2a_f} + \frac{v_p'^2}{2a_p} - \frac{v_p'^2 - v_p^2}{2a_p} \cos\theta$$

where D is the inter-vehicle risk distance, k is an expected non-braking time of the driver, $v_f$ is a traveling speed of the subject vehicle, $v_p$ is a traveling speed of the different vehicle moving into the expected course, $v_p'$ is a traveling speed of the different vehicle after having moved into the expected course, $a_f$ is an acceleration of the subject vehicle, $a_p$ is an acceleration of the different vehicle, and θ is an angle by a speed vector of the different vehicle and a speed vector of the subject vehicle.

18. A driver assist apparatus comprising:
a processor including a memory configured to:
obtain a detected information of a different vehicle driving around a subject vehicle;
calculate a risk estimation value representing a level of risk imposed on the subject vehicle by the different vehicle, using the detected information related to a lateral relative position of the different vehicle with respect to the subject vehicle, on an assumption that the different vehicle which is off an expected course of the subject vehicle moves into the expected course;
select driver assist content corresponding to the risk estimation value calculated by the processor; and
determine whether the different vehicle cuts into the expected course,
wherein:
the driver assist apparatus assists a driver on the subject vehicle with driving tasks;
driver assist corresponding to the different vehicle cutting into the expected course is performed earlier than driver assist corresponding to a preceding vehicle driving on a lane on which the subject vehicle drives;
a time allowance is a time period that allows the subject vehicle to stop without contacting the different vehicle that has moved into the expected course;
the processor calculates the time allowance as the risk estimation value; and
the processor calculates the time allowance from a mathematical expression as defined in $$R_A = \frac{y_0}{v_f} - \left\{ k - \frac{v_f}{2a_f} + \frac{v_p'^2}{2v_f a_p} - \frac{v_p'^2 - v_p^2}{2v_f a_p} \cos\theta \right\}$$

where $R_A$ is the time allowance, k is an expected non-braking time of the driver, $v_f$ is a traveling speed of the subject vehicle, $v_p$ is a traveling speed of the different vehicle moving into the expected course, $v_p'$ is a traveling speed of the different vehicle after having moved into the expected course, $a_f$ is an acceleration of the subject vehicle, $a_p$ is an acceleration of the different vehicle, $y_0$ is an amount of displacement in a front-to-back direction of the different vehicle relative to the subject vehicle, and θ is an angle by a speed vector of the different vehicle and a speed vector of the subject vehicle.

19. A driver assist apparatus comprising:
a processor including a memory configured to:
obtain detected information of a different vehicle driving around a subject vehicle;
calculate a risk estimation value representing a level of risk imposed on the subject vehicle by the different vehicle, using the detected information related to a lateral relative position of the different vehicle with respect to the subject vehicle, on an assumption that the different vehicle drives on an expected course and that the subject vehicle driving off the expected course of the different vehicle moves into the expected course of the different vehicle;
select driver assist content corresponding to the risk estimation value calculated by the processor; and
determine whether the subject vehicle cuts into the expected course of the different vehicle, and the different vehicle cuts into the expected course of the subject vehicle,
wherein:
the driver assist apparatus assists a driver on the subject vehicle with driving tasks;
driver assist for a case where the subject vehicle cuts into the expected course of the different vehicle is performed slower or weaker than driver assist for a case where the different vehicle cuts into the expected course of the subject vehicle;
a time allowance is a time period that allows the subject vehicle to stop without contacting the different vehicle that has moved into the expected course;
the processor calculates the time allowance as the risk estimation value; and
the processor calculates the time allowance from a mathematical expression as defined in $$R_A = \frac{y_0}{v_f} - \left\{ k - \frac{v_f}{2a_f} + \frac{v_p'^2}{2v_f a_p} - \frac{v_p'^2 - v_p^2}{2v_f a_p} \cos\theta \right\}$$

where $R_A$ is the time allowance, k is an expected non-braking time of the driver, $v_f$ is a traveling speed of the subject vehicle, $v_p$ is a traveling speed of the different vehicle moving into the expected course, $v_p'$ is a traveling speed of the different vehicle after having moved into the expected course, $a_f$ is an acceleration of the subject vehicle, $a_p$ is an acceleration of the different vehicle, $y_0$ is an amount of displacement in a front-to-back direction of the different vehicle relative to the subject vehicle, and θ is an angle by a speed vector of the different vehicle and a speed vector of the subject vehicle.

20. A driver assist apparatus comprising:
a processor including a memory configured to:
obtain a detected information of a different vehicle driving around a subject vehicle;
calculate a risk estimation value representing a level of risk imposed on the subject vehicle by the different vehicle, using the detected information related to a lateral relative position of the different vehicle with respect to the subject vehicle, on an assumption that the different vehicle which is off an expected course of the subject vehicle moves into the expected course;
select driver assist content corresponding to the risk estimation value calculated by the processor;
determine whether the different vehicle cuts into the expected course; and
determine proximity of the different vehicle to the subject vehicle,
wherein:
the driver assist apparatus assists a driver on the subject vehicle with driving tasks;
driver assist corresponding to the different vehicle cutting into the expected course is performed earlier than driver assist corresponding to a preceding vehicle driving on a lane on which the subject vehicle drives;
a merging vehicle is defined as the different vehicle moving laterally toward the expected course of the subject vehicle;
the processor determines an absolute value of amount of lateral displacement of the merging vehicle with respect to the subject vehicle;
in response to that it is determined that the absolute value of the amount of lateral displacement is more than zero, a first proximity threshold is set; and
in response to that it is determined that the absolute value of the amount of lateral displacement is zero, a second proximity threshold different from the first proximity threshold is set.

21. A driver assist apparatus comprising:
a processor including a memory configured to:
obtain detected information of a different vehicle driving around a subject vehicle;
calculate a risk estimation value representing a level of risk imposed on the subject vehicle by the different vehicle, using the detected information related to a lateral relative position of the different vehicle with respect to the subject vehicle, on an assumption that the different vehicle drives on an expected course and that the subject vehicle driving off the expected course of the different vehicle moves into the expected course of the different vehicle;
select driver assist content corresponding to the risk estimation value calculated by the processor;
determine whether the subject vehicle cuts into the expected course of the different vehicle, and the different vehicle cuts into the expected course of the subject vehicle; and
determine proximity of the different vehicle to the subject vehicle,
wherein:
the driver assist apparatus assists a driver on the subject vehicle with driving tasks;
driver assist for a case where the subject vehicle cuts into the expected course of the different vehicle is performed slower or weaker than driver assist for a case where the different vehicle cuts into the expected course of the subject vehicle;

a merging vehicle is defined as the different vehicle moving laterally toward the expected course of the subject vehicle;

the processor determines an absolute value of amount of lateral displacement of the merging vehicle with respect to the subject vehicle;

in response to that it is determined that the absolute value of the amount of lateral displacement is more than zero, a first proximity threshold is set; and in response to that it is determined that the absolute value of the amount of lateral displacement is zero, a second proximity threshold different from the first proximity threshold is set.

22. A driver assist apparatus comprising:

a processor including a memory configured to:

obtain a detected information of a different vehicle driving around a subject vehicle;

calculate a risk estimation value representing a level of risk imposed on the subject vehicle by the different vehicle, using the detected information related to a lateral relative position of the different vehicle with respect to the subject vehicle, on an assumption that the different vehicle which is off an expected course of the subject vehicle moves into the expected course;

select driver assist content corresponding to the risk estimation value calculated by the processor; and determine whether the different vehicle cuts into the expected course is an interruption vehicle, wherein:

the driver assist apparatus assists a driver on the subject vehicle with driving tasks;

a threshold value of the risk estimation value used in a driver assist corresponding to a preceding vehicle driving on a lane on which the subject vehicle drives is set to be different from a threshold value of the risk estimation value used in a driver assist corresponding to the interruption vehicle cutting into the expected course so that the driver assist corresponding to the interruption vehicle is performed earlier than the driver assist corresponding to the preceding vehicle; and the processor sets an assumed value of lateral direction acceleration of the interruption vehicle, and then calculates, using same mathematical expression, the risk estimation value corresponding to the preceding vehicle and the risk estimation value corresponding to the interruption vehicle.

23. A driver assist apparatus comprising:

a processor including a memory configured to:

obtain detected information of a different vehicle driving around a subject vehicle;

calculate a risk estimation value representing a level of risk imposed on the subject vehicle by the different vehicle, using the detected information related to a lateral relative position of the different vehicle with respect to the subject vehicle, on an assumption that the different vehicle drives on an expected course and that the subject vehicle driving off the expected course of the different vehicle moves into the expected course of the different vehicle;

select driver assist content corresponding to the risk estimation value calculated by the processor; and determine whether the subject vehicle cuts into the expected course of the different vehicle which is a behind vehicle of the subject vehicle, and the different vehicle cuts into the expected course of the subject vehicle as an interruption vehicle, wherein:

the driver assist apparatus assists a driver on the subject vehicle with driving tasks;

an assumed value applied to the behind vehicle in a calculation of the risk estimation value in a case where the subject vehicle cuts into the expected course of the behind vehicle is set to be different from an assumed value applied to the interruption vehicle in a calculation of the risk estimation value in a case where the interruption vehicle cuts into the expected course of the subject vehicle so that a driver assist for the case where the subject vehicle cuts into the expected course of the behind vehicle is performed slower or weaker than a driver assist for the case where the interruption vehicle cuts into the expected course of the subject vehicle; and the processor sets an assumed value of lateral direction acceleration of the subject vehicle that cuts into the expected course of the behind vehicle and sets an assumed value of lateral direction acceleration of the interruption vehicle that cuts into the expected course of the subject vehicle, and then calculates, using same mathematical expression, the risk estimation value in the case where the subject vehicle cuts into the expected course of the behind vehicle and the risk estimation value in the case where the interruption vehicle cuts into the expected course of the subject vehicle.

* * * * *